United States Patent [19]
Kim et al.

[11] Patent Number: 5,729,688
[45] Date of Patent: Mar. 17, 1998

[54] NETWORK ELEMENT MANAGING SYSTEM

[75] Inventors: Moowan Kim, Kawasaki; Masaaki Wakamoto; Mitsunori Fukazawa, both of Yokohama; Kenichi Fukuda; Kazumasa Ushiki, both of Kawasaki; Shinichi Matsumoto, Yokohama, all of Japan

[73] Assignee: Fujitsu Limited, Kanagawa, Japan

[21] Appl. No.: 448,361

[22] PCT Filed: Sep. 29, 1994

[86] PCT No.: PCT/JP94/01619

§ 371 Date: Dec. 7, 1995

§ 102(e) Date: Dec. 7, 1995

[87] PCT Pub. No.: WO95/09501

PCT Pub. Date: Apr. 6, 1995

[30] Foreign Application Priority Data

Sep. 29, 1993 [JP] Japan .................................. 5-242993

[51] Int. Cl.$^6$ .................................................. G06F 13/14
[52] U.S. Cl. ................ 395/200.56; 364/242.94; 364/DIG. 1
[58] Field of Search ................ 395/200.06, 200.01, 395/200.53, 200.56, 200.59; 364/242.94, DIG. 1

[56] References Cited

U.S. PATENT DOCUMENTS

| | | | |
|---|---|---|---|
| 5,005,122 | 4/1991 | Griffin et al. | 395/200.01 |
| 5,347,511 | 9/1994 | Gun | 370/255 |

FOREIGN PATENT DOCUMENTS

| | | |
|---|---|---|
| 3235443 | 10/1991 | Japan . |
| 3255556 | 11/1991 | Japan . |
| 421147 | 1/1992 | Japan . |
| 468456 | 3/1992 | Japan . |
| 4308951 | 10/1992 | Japan . |

Primary Examiner—John E. Harrity
Attorney, Agent, or Firm—Helfgott & Karas, P.C.

[57] ABSTRACT

A network element managing system includes a management control section for maintaining and managing network elements such as an exchange or a telecommunication line and a communication control section for controlling the communication processing of the network so that an interface is commonly used between the management control section and the communication control section, thereby satisfying a required performance in both of a processing request relating to maintenance, management and operation and a processing request relating to communication. That is, the system of the invention includes a scheduling section for determining execution order on the basis of the attribute of the processing request, and the loads of the communication control section and the management control section. Also, the communication control section and the management control section have a function for scheduling the processing request on the basis of the attribute of the object to be processed, respectively.

16 Claims, 24 Drawing Sheets

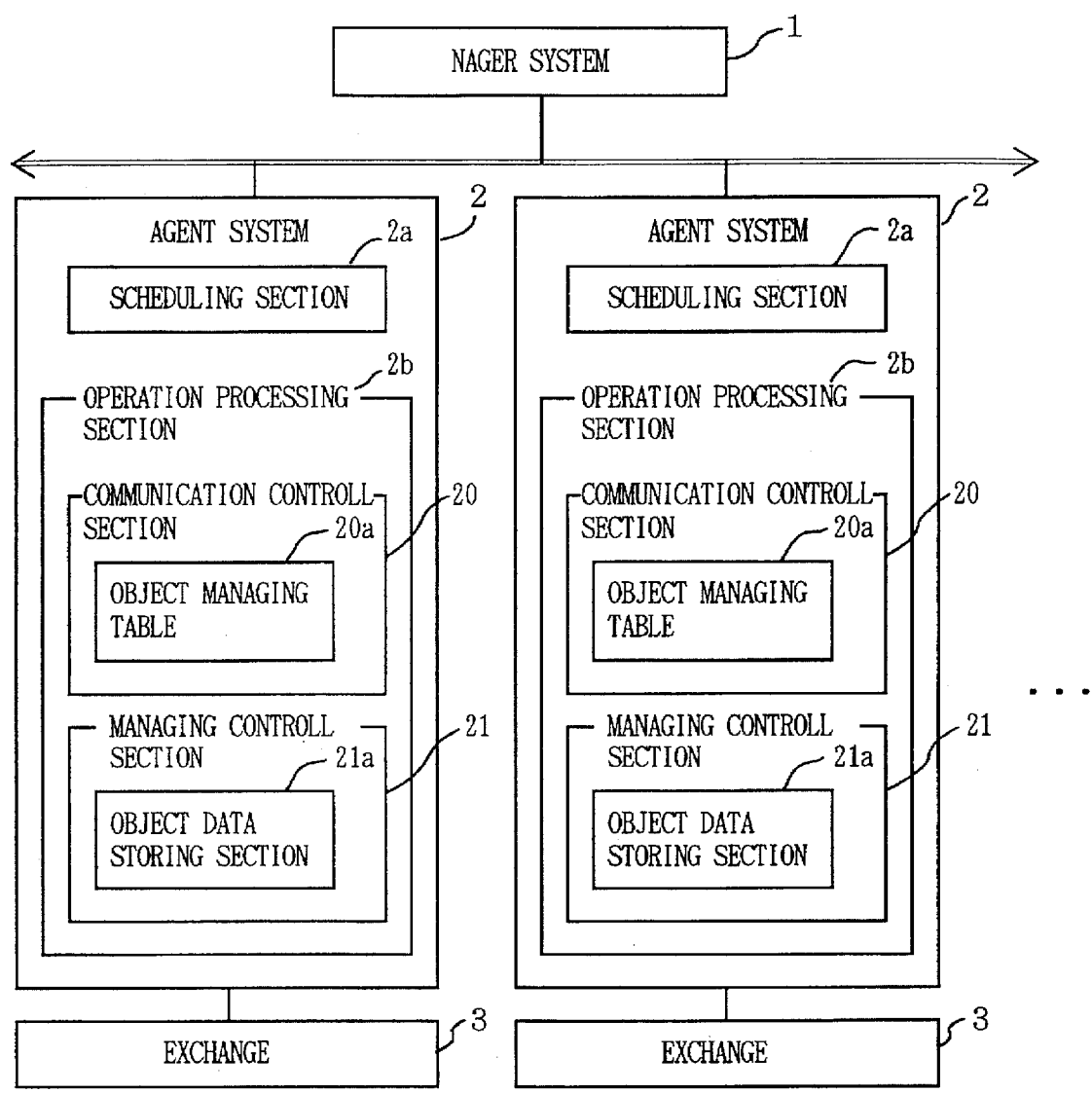
F I G. 1

| OBJECT IDENTIFIER | RESOURCE INDENTIFIER |
|---|---|
| XC-#1 | PATH |
| TP-#1 | TANSI-1 |
| TP-#2 | TANSI-2 |
| ⋮ | ⋮ |

FIG. 4

| OBJECT IDENTIFIER | RESOURCE IDENTIFIER | ATTRIBUTE DATA |
|---|---|---|
| TP-#1 | TANSI-1 | ------- |
| TP-#2 | TANSI-2 | ------- |
| ⋮ | ⋮ | ⋮ |
| XC-#1 | PATH-0001 | ------ |
| ⋮ | ⋮ | ⋮ |

FIG. 5

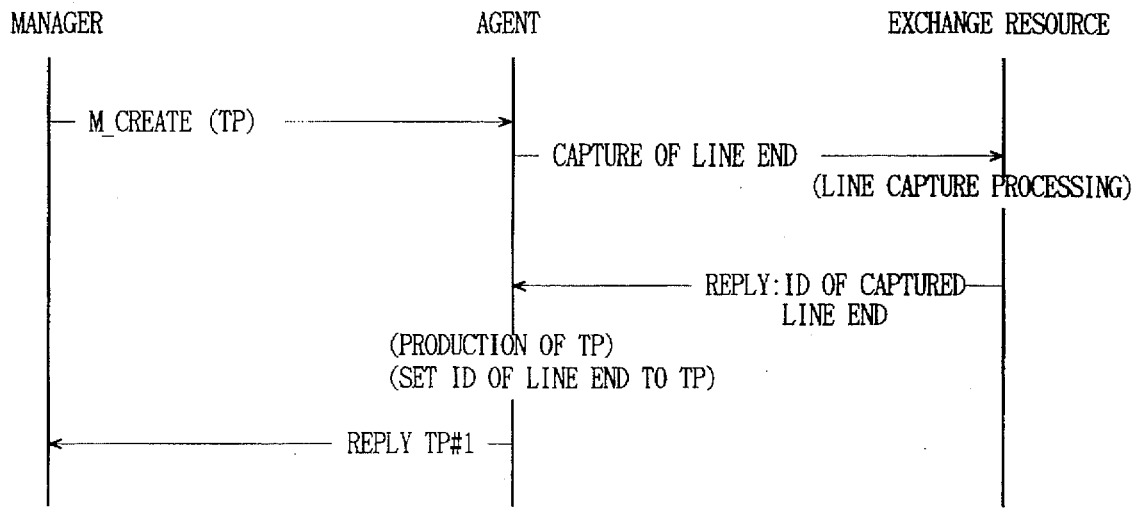
F I G. 6
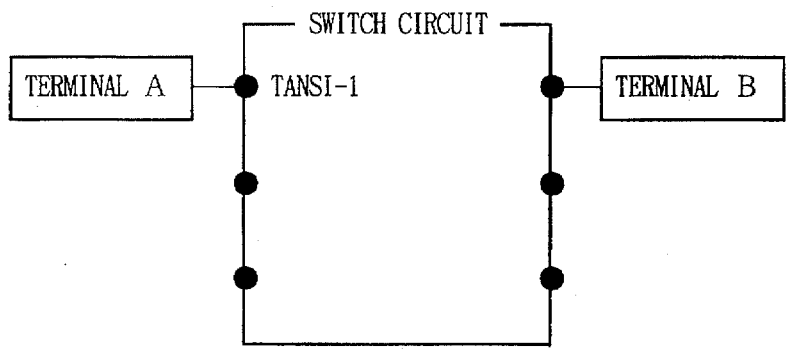
F I G. 7

| DATA | LOCK | | TIMING |
| --- | --- | --- | --- |
| | IN-DEVICE | OUT-OF-DEVICE | |
| A | 0 | 0 | ① |
| | 1 | 1 | ② |
| | 0 | 1 | ④ |
| | 0 | 0 | ⑨ |

FIG. 14

| DATA | LOCK | | TIMING |
|---|---|---|---|
| | IN-DEVICE | OUT-OF-DEVICE | |
| A | 0 | 0 | ① |
| | 1 | 1 | ④ |
| | 0 | 1 | ⑨ |
| | 0 | 0 | ⑮ |

FIG. 16

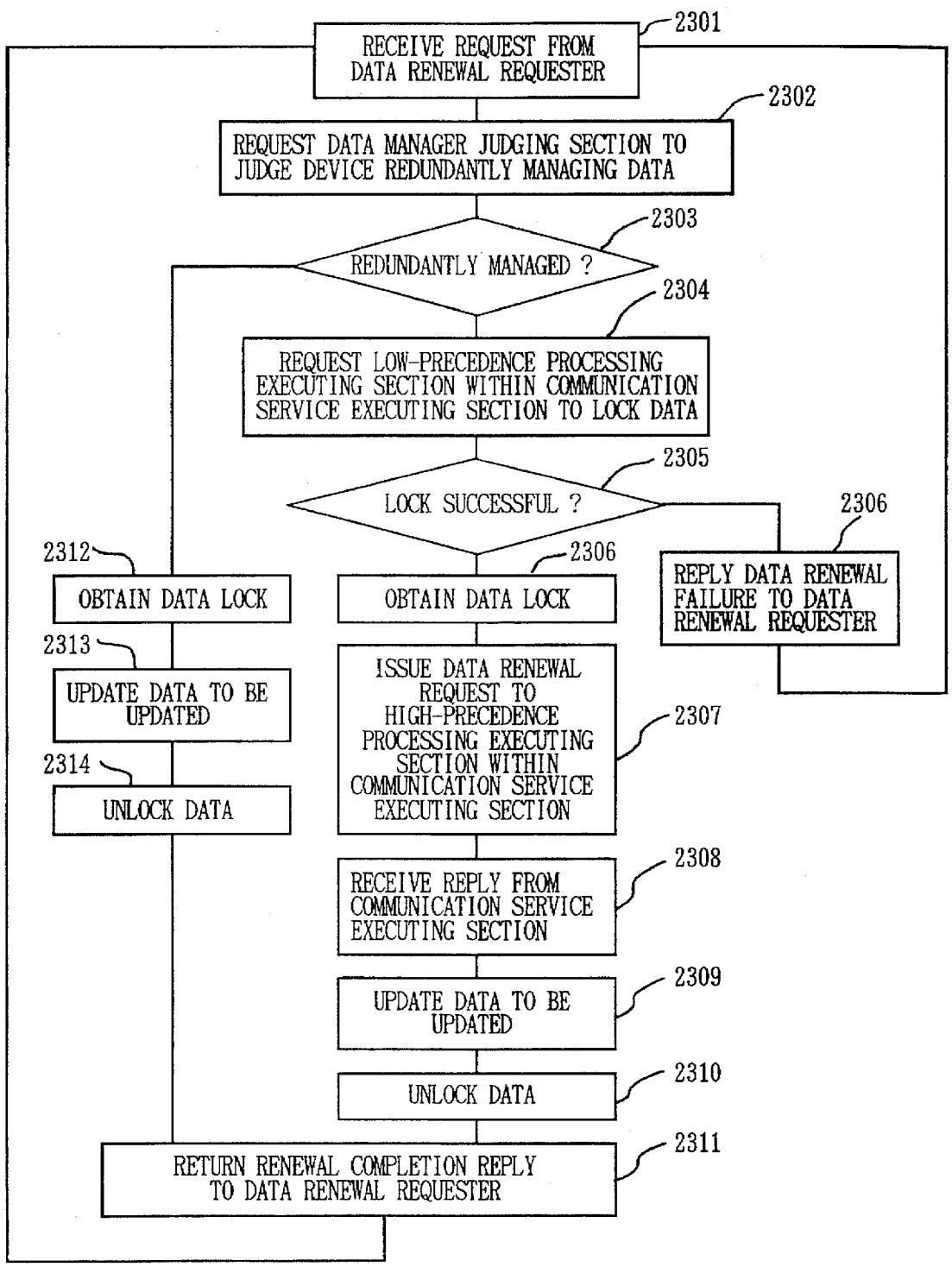
F I G. 2 3

OBJECT ATTRIBUTE TABLE

| OBJECT IDENTIFIER | OBJECT NAME | PRECEDENCE DEGREE DATA | OTHER ATTRIBUTE 636a |
|---|---|---|---|
| DNxxx | vcCTPBid | PRIORITY-#1 | ...... |
| DNyyy | vcCTPBid | PRIORITY-#2 | ...... |
| .... | .... | .... | .... |
| DNzzz | atmXC | PRIORITY-#n | .. |
| .. | .. | .. | .. |

FIG. 25

OBJECT PRECEDENCE DEGREE TABLE — 636b

| PRECEDENCE DEGREE ATTRIBUTE DATA | PRECEDENCE DEGREE DATA ||||||
|---|---|---|---|---|---|---|
| | M-CREATE | M-DELET | M-SET | M-GET | M-EVENT-REP. | M-ACTION |
| PRIORITY-#1 | x x | y y | z z | u u | v v | ACTION-PRIO.-#1 |
| PRIORITY-#2 | x y | y z | z x | u v | v w | ACTION-PRIO.-#2 |
| . . . . . | . . . . | . . . . | . . . . | . . . . | . . . . | . . . . |
| PRIORITY-#n | u x | u y | u w | v x | v y | ACTION-PRIO.-#n |
| . . | . . | . . | . . | . . | . . | . . |

FIG. 26

ACTION PRECEDENCE DEGREE TABLE 636c

| ACTION PRECEDENCE DEGREE ATTRIBUTE DATA | PRECEDENCE DEGREE DATA | | |
|---|---|---|---|
| | connect | disconnect | ...... |
| ACTION-PRIO.-#1 | a x | b y | ...... |
| ACTION-PRIO.-#2 | b x | c y | ...... |

F I G. 27

NETWORK ELEMENT MANAGING SYSTEM

BACKGROUND OF THE INVENTION

1. Field of the Invention

The present invention relates to a system for controlling, maintaining and managing network elements consisting of an exchange, a telecommunication line and so on.

2. Background of the Invention

In general, a telecommunication network is made up of network elements such as an exchange, a switching office, a subscriber's line, a transmission line, a power supply equipment and the like, and a system for maintaining and managing those network elements.

The system for maintaining and managing the network elements is comprised of a manager system for integrally managing a plurality of network elements and an agent system for maintaining the respective network elements.

The agent system is provided with a function for executing the monitoring, examination, control, fault-restoration, equipment operation, etc. of the respective network elements in accordance with an instruction from the manager system. The agent system is further provided with a function for collecting and storing the operation histories of the respective network elements under monitoring or examination and for notifying the manager system of those operation histories.

On the other hand, in a communication processing (service control) such as setting or releasing of a path, there is a technique for separating an exchange function and a service control function as in an intelligent network. In the technique, the service control system forwards an instruction to an exchange system so that the exchange system provides a required service.

However, the maintaining/managing system is independent from the service control system, to thereby require a communication device every system. Moreover, this causes both the systems to reserve and manage data relating to the network elements and the like.

Further, in recent years, the rising expectation that the communication service is highly developed requires service control (or maintenance/management) based on information relating to both of the maintenance/management and service control. However, the independence of the maintenance/management system from the service control system makes it difficult to mutually refer to information.

SUMMARY OF THE INVENTION

An object of the present invention is to provide a technique effective in realizing common device or data and a complicated and highly advanced service due to mutual cooperation.

In order to solve the foregoing problem, the present invention provides a system for controlling, maintaining and managing network elements such as an exchange and a telecommunication line in which an interface between a manager system and an agent system is made common to an interface between a service control system for a communication service and an exchange system. With this structure, the system of the invention allows the common interface to perform the service control and the maintenance/management.

In other words, a network element managing system of the present invention includes managing means and agent means, in which the manager means serves as a system for allowing the network elements to execute service control and maintenance/management through the agent means.

In detail, the manager means includes a function for issuing a communication processing request in addition to a function for issuing a processing request relating to the maintenance, operation and management of network elements.

According to such a structure of the manager means, the agent means includes a function for controlling a communication processing of the network elements in addition to a function for executing the maintenance, operation and management of the network elements such as an exchange and a telecommunication line.

The agent means further includes a scheduling function for discriminating a processing relating to maintenance, operation and management and a communication processing, and for executing the communication processing in precedence to the processing relating to maintenance, operation and management, for executing the communication processing in real time.

One example of that scheduling technique is, for example, of a technique in which a CPU-occupied period of time assigned to a task for executing the communication processing is longer than that assigned to a task for executing the processing relating to maintenance. Moreover, in the communication processing, a CPU-occupied period of time assigned to a task for executing a call setting processing may be made longer than that assigned to a task for a setting release processing.

Further, the agent means includes a scheduling section and an operation processing section.

The scheduling section is provided with a function for transmitting/receiving data to/from the manager means and a function for discriminating whether the processing request from the manager means is a processing request relating to the maintenance/management of a network or a processing request relating to the communication processing to determine a precedence of the processing requests.

The operation processing section includes a function for determining a processing request in accordance with the precedence determined by the scheduling section. The operation processing section includes a communication control section for executing the processing request relating to a communication and a management control section for executing the processing request relating to the maintenance/management.

Furthermore, the communication control section includes an object management table for registering a resource identification information specifying the respective resources within the network and an object identifier where each resource has been converted into a logic model.

On the other hand, the management control section includes a object data storing section for storing a resource identifier specifying the respective resources within the network, an object identifier where each resource has been converted into a logic model, and attribute data of the respective resources.

The network element managing system with the foregoing structure selects an appropriate network element from the position of a subscriber when the manager means receives a predetermined call setting request between the subscribers from a specific subscriber, for example, an information provider of an information providing service to transmit a processing request to the agent means for the selected network element.

The scheduling section of the agent means analyzes the processing request and discriminates whether it is a processing request relating to the communication processing or a processing request relating to the maintenance. Further, the agent means assigns an execution time in accordance with a precedence degree of the processing request. In detail, the scheduling section assigns an unoccupied period of time of a CPU as an execution time if the processing request is a processing request relating to maintenance, but assigns an execution time in precedence if it is a communication processing request.

The operation processing section starts the management control section in accordance with the execution time which has been determined by the scheduling section if the processing request is a processing request relating to maintenance/management. Then, the management control section executes the processing request and notifies the manager means of the execution result.

Also, in the case where the processing request is a processing request relating to communication, the operation processing section starts the communication control section in accordance with an instruction from the scheduling section. Then, the communication control section converts the processing request into a command form which is capable of being processed by the network element to allow the network element to execute the requested processing. Further, the communication control section notifies the manager means of the execution result of the processing request.

BRIEF DESCRIPTION OF THE DRAWINGS

FIG. 1 is a block diagram showing the respective functional structures of a network element managing system in accordance with a first embodiment of the present invention;

FIG. 4 is a diagram showing an example of an object managing table;

FIG. 5 is a diagram showing an example of an object data base;

FIG. 6 is a diagram showing a sequence 1 of a network element managing system in a call setting operation;

FIG. 7 is a diagram showing an image of a call setting processing corresponding to the sequence of FIG. 6;

FIG. 14 is a diagram showing the state transition of a lock identification flag of the object managing table in the operation of FIG. 13;

FIG. 16 is a diagram showing the state transition of a lock identification flag of an object data base in the operation of FIG. 15;

FIG. 23 is a flowchart showing the operation of a low-precedence processing unit in the maintenance service executing section;

FIG. 25 is a diagram showing an example of an object attribute table;

FIG. 26 is a diagram showing an example of an object precedence degree table;

FIG. 27 is a diagram showing an example of an action precedence degree table;

Figure 2:
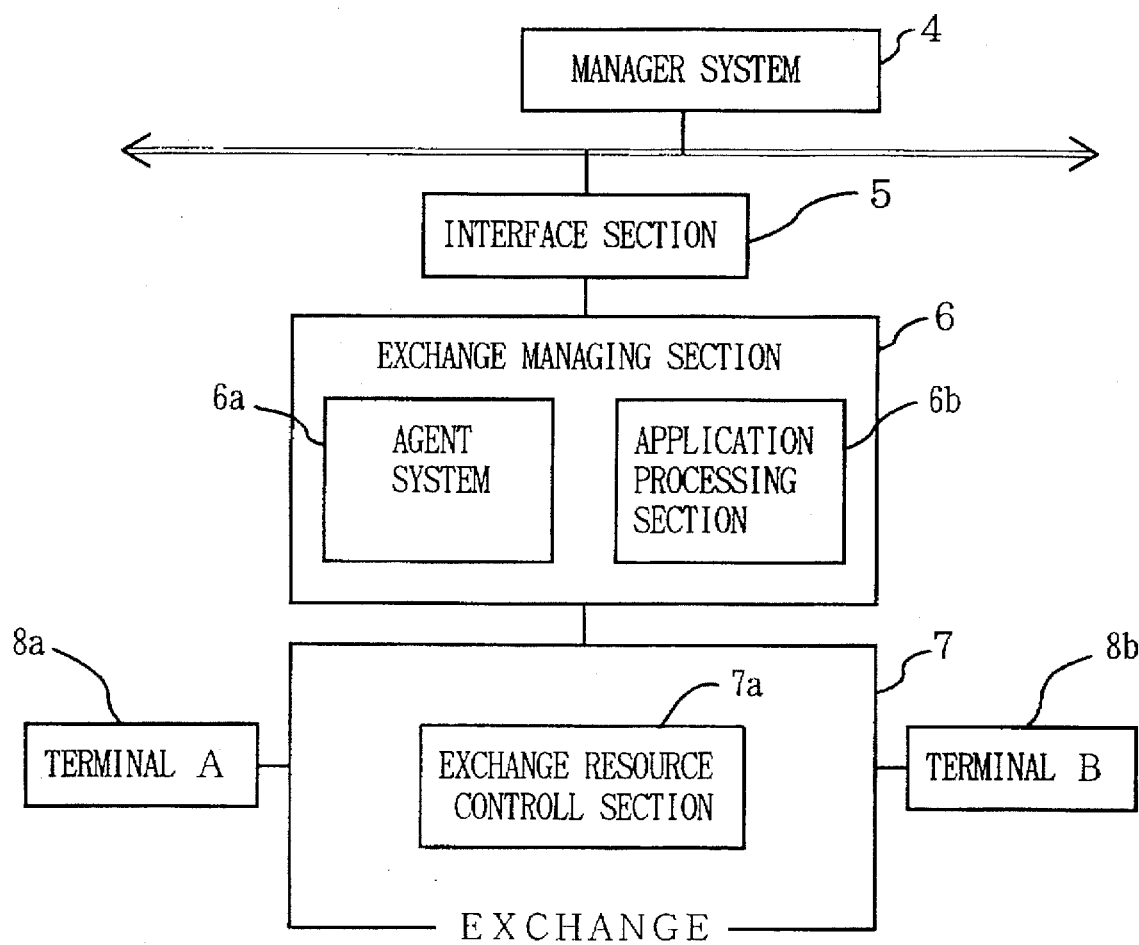
FIG. 2 is a schematic structural diagram showing a communication network to which a network element managing system in accordance with a second embodiment of the present invention is applied.

DETAILED DESCRIPTION OF THE PREFERRED EMBODIMENTS (First Embodiment)

FIG. 1 is a block diagram showing the respective functional structures of a network element managing system in accordance with a first embodiment of the present invention.

The network element managing system includes a manager system 1 and an agent system 2. The agent system 2 is provided with a function for converting, upon reception of a communication processing request from the manager system 1, the processing request into a command form which is capable of being processed by an exchange 3 to allow the exchange 3 to execute the requested processing.

In detail, the manager system 1 includes a function for issuing a communication processing request in addition to a function for issuing a processing request relating to the maintenance, operation and management of network elements.

Correspondingly to the manager system 1, the agent system 2 includes a function for controlling a communication processing of an exchange 3 in addition to a function for executing the maintenance, operation and management of the network elements such as the exchange 3 and a telecommunication line.

The agent system 2 further includes a scheduling section 2a and an operation processing section 2b.

The scheduling section 2a is provided with a function for discriminating, upon reception of a processing request, whether the processing request is a request relating to maintenance, operation and management or a request relating to communication. Further, the scheduling section 2a has a function for determining a precedence order of the respective processing request processing in accordance with the attribute of the processing request. Concretely, the scheduling section 2a gives a precedence order higher than that of the processing request relating to maintenance, operation and management to the processing request relating to communication.

The operation processing section 2b is provided with a function for executing the processing request in accordance with an execution time which has been determined by the scheduling section 2a. Concretely, the operation processing section 2b includes a communication control section 20 and a management control section 21.

The communication control section 20 has a function for allowing the exchange 3 to execute the processing request relating to communication and for notifying the manager system 1 of the execution result. In detail, the communication control section 20 has a function for converting the processing request relating to communication into a command form which is capable of being processed by the exchange 3, a function for allowing the exchange 3 to execute the processing request thus converted, and a function for notifying the manager system 1 of the execution result of the processing request. The communication control section 20 further includes an object managing table 20a for storing therein a resource identifier for specifying the respective resources within a network and an object identifier where each resource has been converted into a logic model.

The management control section 21 has a function for executing a processing request relating to the maintenance/management of the network to notify the manager system 1 of the execution result. The management control section 21 also includes an object managing table 21a for storing therein a resource identifier for specifying the respective resources within the network, an object identifier where each resource has been converted into a logic model, and attribute data of the respective resources.

Hereinafter, a description will be given of the operation of a network element managing system in accordance with a first embodiment of the present invention.

The manager system 1 selects, upon reception of a call setting request between predetermined subscribers from information provider of an information providing service, an appropriate network element from the position of the subscriber and transfers a processing request to the agent system 2 of that network element.

The scheduling section 2a of the agent system 2 analyzes the processing request and discriminates whether it is a processing request relating to a communication processing or a processing request relating to maintenance. In accordance with the discrimination result, the scheduling section 2a determines a precedence order of the processing request and starts the operation processing section 2b.

The operation processing section 2b starts the management control section 21 in accordance with the precedence order which has been determined by the scheduling section 2a if the processing request is a processing request relating to maintenance. The management control section 21 executes the processing request.

On the other hand, if the processing request is a processing request relating to a communication processing, the operation processing section 2b starts the communication control section 20 immediately.

The communication control section 20 converts the processing process into a command form which is capable of being processed by the exchange 3 and notifies the exchange 3 of it.

The operation processing section 2b notifies the manager system 1 of the execution result of the communication control section 20 or the execution result of the management control section 21.

As described above, according to the first embodiment of the invention, the system for maintaining and managing the network element can execute the communication processing in real time.

(Second Embodiment)

Hereinafter, a description will be given of a second embodiment of the present invention with reference to the drawings.

FIG. 2 is a schematic structural diagram showing a communication network to which a network element managing system is applied.

The network element management system of this embodiment is designed so as to connect a manager system 4 and an exchange managing section 6 through an interface section 5, and connect an exchange 7 to the exchange managing section 6.

The interface section 5 is formed of an MO (managed object) interface which has been conducting a standardization action even in an ISO or ITU-T (old CCITT) at the present time. A CMIP is adopted as the communication protocol of the manager system 4 and the exchange managing section 6.

In this example, the manager system 4 has a function for issuing a communication service request and a maintenance service request to the exchange managing section 6. In detail, the manager system 4 is provided with call control functions such as a signal terminal, routine, subscriber/service analysis, issuance of a communication service request of network functions necessary for realizing a line connection service.

The exchange managing section 6 includes an agent system 6a and an application processing section 6b. The agent system 6a executes a service request from the manager system 4, and the application processing section 6b executes a maintenance service of the exchange 7 independently from the manager system 4 through application software which has been previously registered therein.

Furthermore, the exchange 7 is equipped with an exchange resource control section 7a for controlling the operation of an exchange resource. The exchange resource control section 7a is comprised of a plurality of routines for executing the control order of a variety of exchange resources, which does not depend on the attribute of a service. The control order is, for example, of a line capture order, a path capture order, a path connection order, a system change-over order.

In this example, in the case of introducing the foregoing network element managing system to a network which does not support the MO interface, an application for controlling a resource by successively starting the foregoing order is structured within the system of this embodiment.

Figure 3:
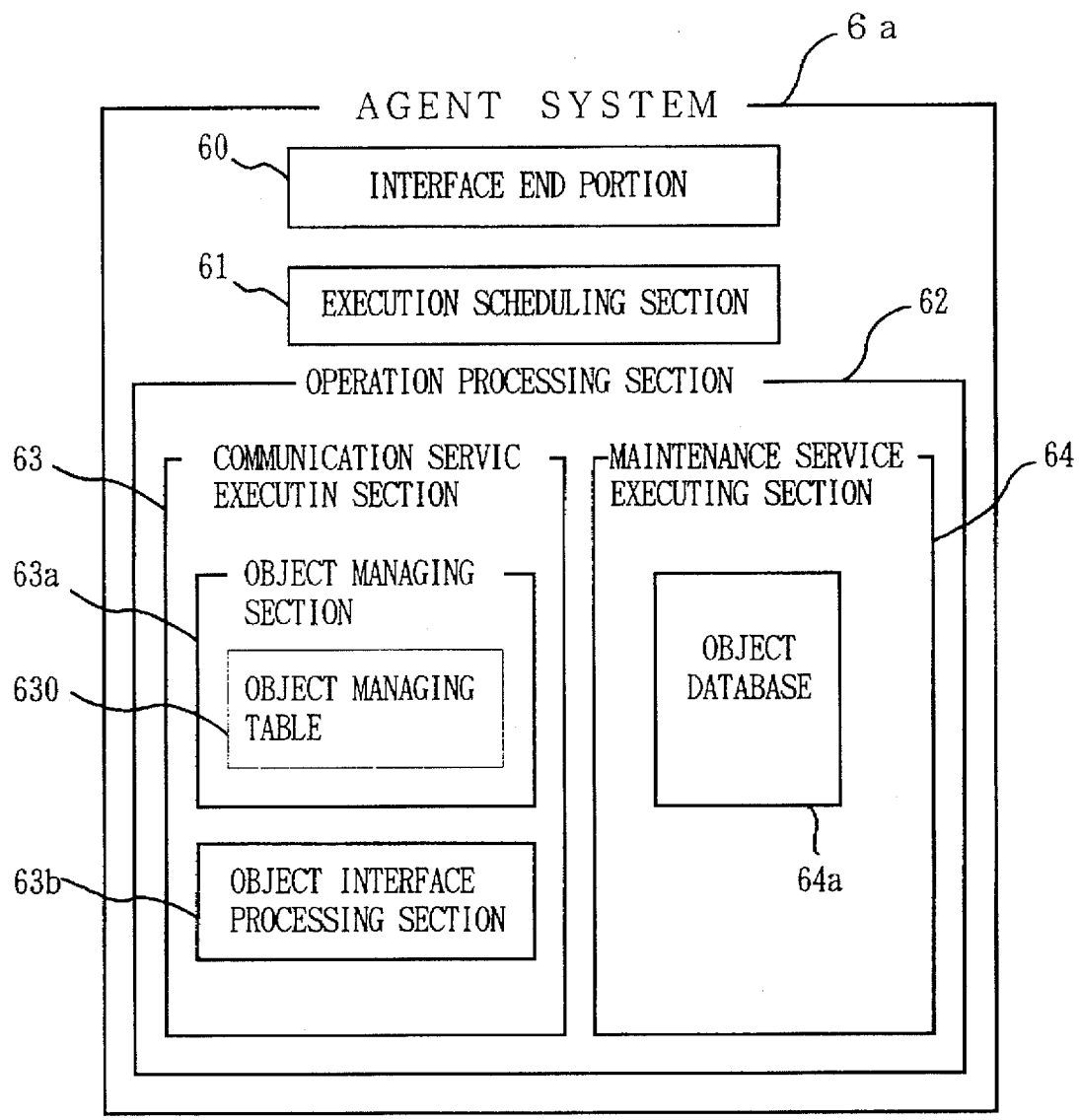
FIG. 3 is a block diagram showing the respective functional structures of an agent system.

Subsequently, a description will be given of the function of the agent system 6a with reference to FIG. 3. FIG. 3 is a block diagram showing the respective functional structures of the agent system, and the agent system 6a according to the second embodiment is equipped with an interface end portion 60, an execution scheduling section 61, and an operation processing section 62.

The interface end portion 60 is arranged to process the communication protocol of data delivered between the manager system 4 and the execution scheduling section 61.

The execution scheduling section 61 analyzes the service request from the manager system 4 and discriminates whether the service request in question is of a maintenance service request or a communication service request. The execution scheduling section 61 determines a precedence order of the service requests in accordance with the kind of the service. Concretely, the execution scheduling section 61 determines a CPU-occupied time which is assigned to the execution task of the various services. In particular, since the communication service such as a call connection service is necessarily processed in real time, the CPU-occupied time longer than that assigned to the maintenance service execution task is assigned to the communication service.

The operation processing section 62 is arranged so as to process the service request on the basis of an execution time assigned to the execution scheduling section 61, and include a communication service executing section 63 and a maintenance service executing section 64.

The communication service executing section 63 is equipped with a function for converting a communication service request from the manager system 4 into a command form which is capable of being processed by the exchange resource control section 7a, and a function for operating the exchange resource control section 7a in accordance with the execution time to execute the communication service request. In detail, the communication service executing section 63 includes an object managing section 63a and an object interface processing section 63b. The object managing section 63a has an object managing table (refer to FIG. 4) for registering a correspondence between the resource identifiers of the respective resources and the objects where the respective resources have been converted into logic models.

The object interface processing section 63b has a function for converting data received from the object managing section 63a into a language form which is capable of being processed by the exchange resource control section 7a, and a function for converting data received by the exchange resource control section 7a into a language form which is capable of being processed by the object managing section 63a.

The maintenance service executing section 64 includes an object data base 64a (refer to FIG. 5) for storing resource identifiers and attribute information of the respective resources every object identifier.

Hereinafter, a description will be given of an operation process of the network element managing system in accordance with the second embodiment, referring to an example where a call is set between a terminal A (8a) and a terminal B (8b).

In FIG. 6, when the manager system 4 issues a line end terminal capture order of the terminal A (8a), the interface end portion 60 converts the protocol of that order and notifies the execution scheduling section 61 of it in the agent system 6a.

The execution scheduling section 61 analyzes the order in question and discriminates whether it is a communication service request or a maintenance service request. In this example, since the order in question is of a line terminal capture order (communication service request), the execution scheduling section 61 assigns a high precedence order to the order in question and notifies the communication service executing section 63 of the operation processing section 62 of the order in question.

In the communication service executing section 63, the object managing section 63a analyzes the order in question and discriminates that request contents are of a capture request for a communication line end terminal.

Concretely, the manager system 4 transmits a line capture order to which a "TP" where the end terminal of the communication line has been converted into an object and a reception number of the terminal A (8a) have been added to the object managing section 63a. The object managing section 63a extracts the object "TP" of the line end terminal from the line capture order and assigns an object identifier "TP-#1" for identifying the respective line end terminals to the line end terminal. Simultaneously, the object managing section 63a discriminates a source name "TANSI" of the object "TP", and notifies the object interface processing section 63b of the object identifier "TP-#1" and the resource name "TANSI". The object interface processing section 63b converts the line capture order into a language form which is capable of being processed by the exchange resource control section 7a on the basis of the resource name "TANSI" and the reception number, and transmits the converted order to the exchange resource control section 7a.

Upon reception of the line capture order, the exchange resource control section 7a discriminates the line end terminal of the terminal A (8a) from the reception number of the terminal A (8a), and monitors a switching circuit of the exchange 7 to discriminate whether the line end terminal is in an unoccupied state, or not. If it is in the unoccupied state, the exchange resource control section 7a captures that line end terminal (refer to FIG. 7), and transmits the resource ID "TANSI-1" of the line end terminal to the agent system 6a.

In the agent system 6a, the communication service executing section 63 receives the resource ID "TANSI-1". In the communication service executing section 63, the object interface processing section 63b notifies the object managing section 63a of the object identifier "TP-#1" and the resource ID "TANSI-1" before notifying the maintenance service executing section 64 of the resource ID "TANSI-1" of the line end terminal, the object identifier "TP-#1" assigned to the line end terminal and the attribute information of the line end terminal.

In this example, the maintenance service executing section 64 updates the object data base 64a on the basis of the object identifier "TP-#1", the resource ID "TANSI-1" and the attribute information.

On the other hand, the object managing section 63a notifies the execution scheduling section 61 of the object identifier "TP-#1" as well as a notice of the line capture completion simultaneously while registering the object identifier "TP-#1" and the resource ID "TANSI-1" in the object managing table. The execution scheduling section 61 transmits the object identifier "TP-#1" and a notice of the line capture completion to the manager system 4.

Figure 8:
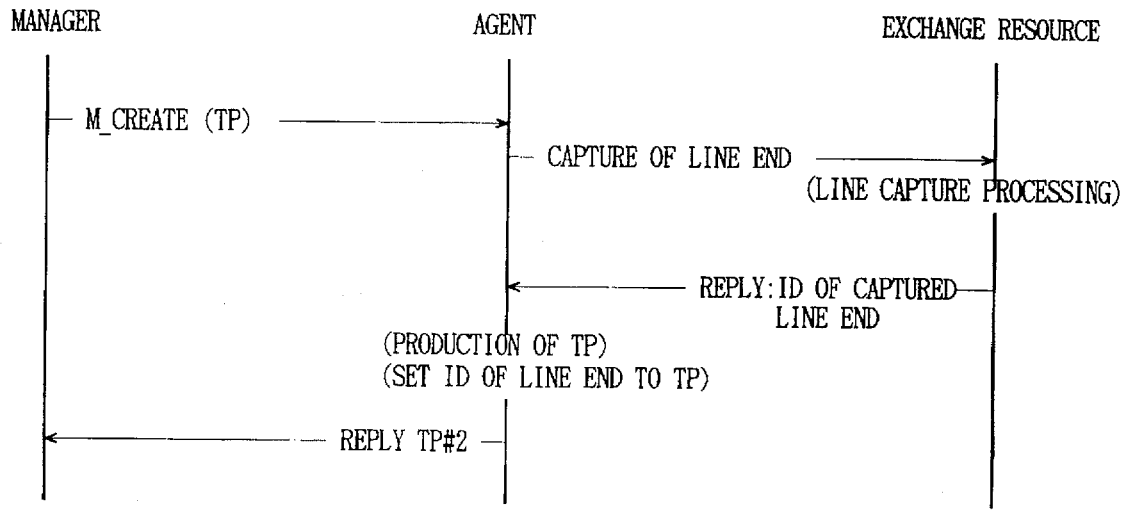
FIG. 8 is a diagram showing a sequence 2 of a network element managing system in a call setting operation.

Subsequently, the manager system 4 transmits the line end terminal capture order of the terminal B (8b). The agent system 6a processes the line end terminal capture order. The processing procedure will be described with reference to a sequence shown in FIG. 8.

In the agent system 6a, the interface end portion 60 subjects the order from the manager system 4 to a protocol processing to notify the execution scheduling section 61 of the processed order.

The execution scheduling section 61 analyzes the order, recognizes that the order is a line end terminal capture order, and assigns a high precedence order to that order. Then, the execution scheduling section 61 notifies the communication service executing section 63 in the operation processing section 62 of that order.

In the communication service executing section 63, the object managing section 63a analyzes that order, extracts the "TP" where the line end terminal has been converted into an object from the order, and assigns an object identifier "TP-#2" for identifying the respective line end terminals to the line end terminal. Simultaneously, the object managing section 63a discriminates the source name "TANSI" of the object "TP", and notifies the object interface processing section 63b of the object identifier "TP-#2" and the resource name "TANSI".

The object interface processing section 63b converts the line capture order into a language form which is capable of being processed by the exchange resource control section 7a on the basis of the resource name "TANSI" and the reception number of the terminal B (8b), and transmits it to the exchange resource control section 7a.

Figure 9:
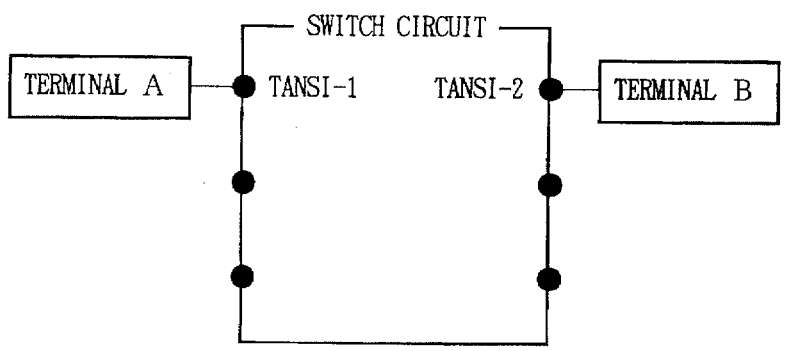
FIG. 9 is a diagram showing an image of a call setting processing corresponding to the sequence of FIG. 8.

Upon reception of the line capture order, the exchange resource control section 7a discriminates the line end terminal of the terminal B (8b) from the reception number of the terminal B (8b), and monitors a switching circuit in the exchange 7 to discriminate whether the line end terminal is in an unoccupied state, or not. If it is in the unoccupied state, the exchange resource control section 7a captures the line end terminal (refer to FIG. 9), and transmits the resource ID "TANSI-2" of the line end terminal to the agent system 6a.

In the agent system 6a, the communication service executing section 63 receives the resource ID "TANSI-2". In the communication service executing section 63, the object interface processing section 63b notifies the object managing section 63a of the object identifier "TP-#2" and the resource ID "TANSI-2" before notifying the maintenance service executing section 64 of the resource ID "TANSI-2" of the line end terminal, the object identifier "TP-#2" assigned to the line end terminal and the attribute information of the line end terminal.

In this example, the maintenance service executing section 64 updates the object data base 64a on the basis of the object identifier "TP-#2", the resource ID "TANSI-2" and the attribute information.

On the other hand, the object managing section 63a registers the object identifier "TP-#2" and the resource ID "TANSI-2" in the object managing table, and simultaneously notifies the execution scheduling section 61 of the object identifier "TP-#2" as well as a notice of the line capture completion. The execution scheduling section 61 transmits the object identifier "TP-#2" and the notice of the line capture completion to the manager system 4.

Figure 10:
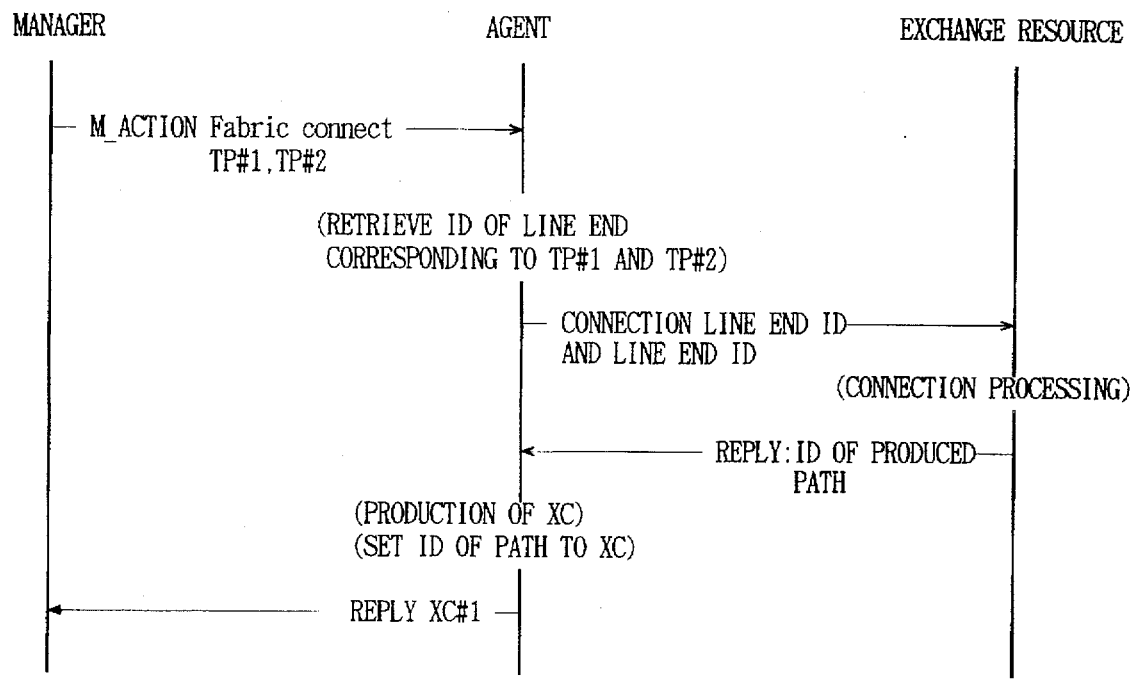
FIG. 10 is a diagram showing a sequence 3 of a network element managing system in a call setting operation.

Further, upon the recognition of the capture of the line end terminal of the terminal A (8a) and the line end terminal of the terminal B (8b), the manager system 4 transmits a capture request for a path connecting those line end terminals to the agent system 6a. Concretely, the manager system 4 transmits to the agent system 6a the connection path capture order for those line end terminals together with the object identifiers "TP-#1" and "TP-#2" of the line end terminals to be connected. Hereinafter, a description will be given of a processing procedure of the agent system 6a with reference to a sequence shown in FIG. 10.

In the agent system 6a, the interface end portion 60 converts the protocol of the order and notifies the execution scheduling section 61 of the converted order.

The execution scheduling section 61 analyzes the order, recognizes that it is a path connection request, and assigns a high precedence order to that order. Then, the execution scheduling section 61 notifies the communication service executing section 63 of that order.

In the communication service executing section 63, the object managing section 63a analyzes that order and discriminates that the requested contents are of a request for connecting a path between the line end terminals "TP-#1" and "TP-#2". Thereafter, an object identifier "XC#1" is assigns to a path to be connected. Moreover, the object managing section 63a discriminates the resource name "PATH" of the path as well as the resource IDs "TANSI-1" and "TANSI-2" of the line end terminals "TP-#1" and "TP-#2", and notifies the object interface processing section 63b of the object identifiers "XC-#1" and the resource name "PATH" of the path, and the object identifier "TP-#1", "TP-#2" and the resource IDs "TANSI-1" and "TANSI-2" of the line end terminal.

The object interface processing section 63b converts the path connection order into a language form which is capable of being processed by the exchange resource control section 7 on the basis of the source name "PATH" and the resource IDs "TANSI-1" and "TANSI-2" of the line end terminal, to transmit the order to the exchange resource control section 7a.

Figure 11:
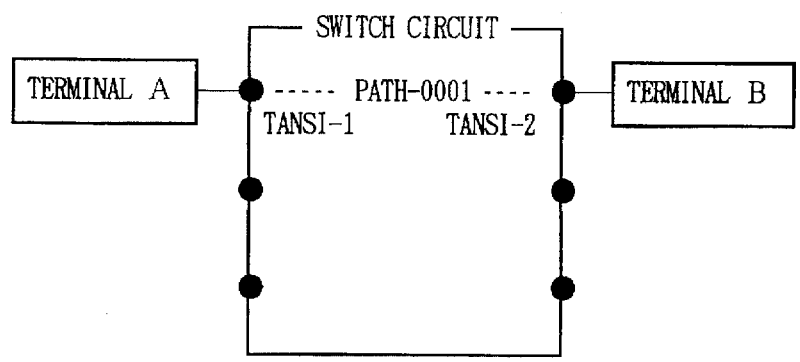
FIG. 11 is a diagram showing an image of a call setting processing corresponding to the sequence of FIG. 10.

Upon the reception of the path connection order, the exchange resource control section 7a monitors the state of the switch circuit and discriminates whether there exists a path which is capable of connecting the line end terminal "TANSI-1" and the line end terminal "TANSI-2", or not. If there is such a path, the exchange resource control section 7a captures the path (refer to FIG. 11) and transmits the resource IDs "PATH-0001" of the path to the agent system 6a.

In the agent system 6a, the communication service executing section 63 receives the resource ID "PATH-0001". In the communication service executing section 63, the object interface processing section 63b notifies the object managing section 63a of the object identifier "XC-#1" and the resource ID "PATH-0001" before notifying the maintenance service executing section 64 of the resource ID "PATH-0001" of this path, the object identifier "XC-#1" assigned to the path and the attribute information of the line end terminal.

In this example, the maintenance service executing section 64 updates the object data base 64a on the basis of the object identifier "XC-#1", the resource ID "PATH-0001" and the attribute information of the path.

On the other hand, the object managing section 63a registers the object identifier "XC-#1" and the resource ID "PATH-0001" in the object managing table, and simultaneously notifies the execution scheduling section 61 of the object identifier "XC-#1" and a notice of the path connection completion. In this situation, the execution scheduling section 61 transmits the object identifier "XC-#1" and the notice of the path connection completion to the manager system 4 through the interface end terminal 60.

As described above, according to the second embodiment, the communication service request issued from the manager system 4 can be executed in real time, and the consistency between the object managing table and the object data base 64a can be held.

(Third Embodiment)

Figure 12:
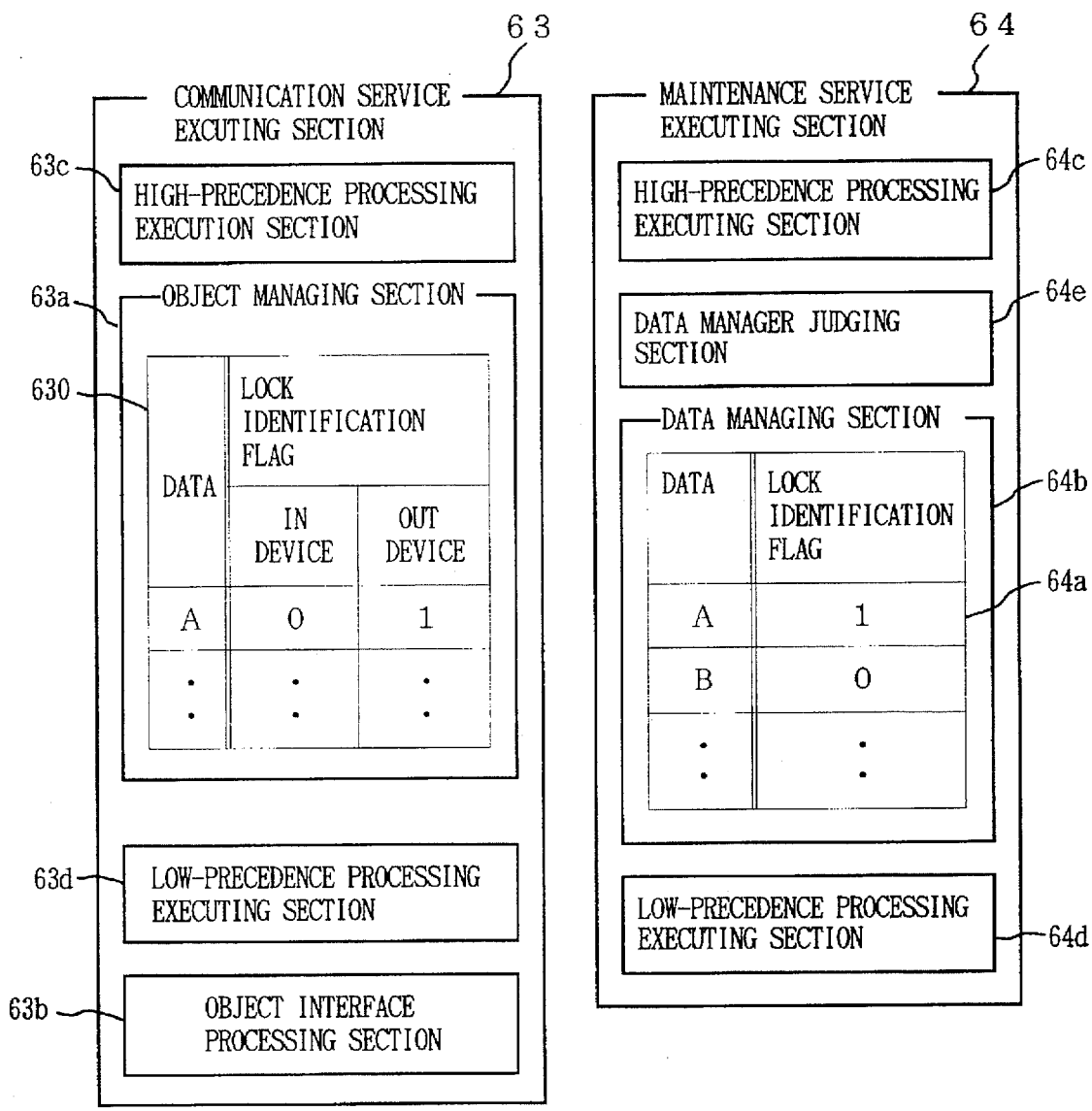
FIG. 12 is a block diagram showing the respective functional structures of an operation processing section in accordance with a third embodiment of the present invention.

FIG. 12 is a block diagram showing the respective functional structures of an operation processing section 62 in accordance with a third embodiment of the present invention.

The operation processing section 62 is made up of the communication service executing section 63 and the maintenance service executing section 64 as in the foregoing first embodiment.

(Structure of Communication Service Executing Section 63)

The communication service executing section 63 is equipped with a high precedence processing section 63c and a low precedence processing section 63d in addition to the structure of the foregoing first embodiment.

The high precedence processing section 63c is arranged to execute processing requiring a high-speed property. Concretely, the high precedence processing section 63c is provided with a function for executing a data renewal request from the manager system 4 or the low precedence processing executing section 64d within the maintenance service executing section.

The low-precedence processing executing section 63d is arranged to execute processing requiring no high-speed property. Concretely, the low-precedence processing executing section 63d has a function for executing a processing request from the maintenance service executing section 64.

The high-precedence processing executing section 63c and the low-precedence processing executing section 63d have a function which is realized by making the CPU execute the program module. Then, the program module of the high-precedence processing executing section 63c can use the CPU in precedence to the program module of the low-precedence processing executing section 63d. Therefore, upon the reception of a processing request, the high-precedence processing executing section 63c can execute the processing request immediately. On the other hand, the low-precedence processing executing section 63d executes the processing when the load of the CPU is small, that is, in the intervals of the processing of the high-precedence processing executing section 63c.

The low-precedence processing executing section 63d is provided with a function for executing a plurality of processing in parallel since no high-speed processing is required.

The object managing table 630 according to the third embodiment registers an in-device lock identification flag and an out-of-device lock identification flag every data. The in-device lock represents a state of prohibiting access to the respective data from the interior of the communication service executing section 63. The in-device lock identification flag is of a flag for identifying whether access to the respective data from the interior of the communication service executing section is in a prohibiting state, or not.

On the other hand, the out-of-device lock shows a state of prohibiting access to the respective data from the exterior of the communication service executing section. The out-of-device lock identification flag is of a flag for identifying whether access to the respective data from the exterior of the communication service executing section is in a prohibiting state, or not.

Further, the object managing section 63a is equipped with a function for locking data to be updated inside of the device while locking the data outside of the device, and a function for rewriting the contents of locked data in accordance with the renewal request.

Next, a description will be given of the detailed functions of the foregoing respective sections with reference to FIG. 13.

Upon reception of a renewal request of the object managing table 630 from the manager system 4, the high-precedence processing executing section 63c discriminates data to be updated. The high-precedence processing executing section 63c requests the object managing section 63a to lock data to be updated.

Upon reception of a request of locking data from the high precedence processing executing section 63c, the object managing section 63a gains access to the object managing table 630 and rewrites the in-device lock identification flag of the data into a lock state, and simultaneously rewrites the out-of-device lock identification flag into a lock state.

Upon recognizing the in-device lock and the out-of-device lock, the high-precedence processing executing section 63c instructs the renewal of data to the object managing section 63a.

Upon reception of the renewal instruction from the high-precedence processing executing section 63c, the object managing section 63a rewrites data of the object managing table 630 in accordance with that instruction.

Moreover, upon recognizing the renewal of data, the high-precedence processing executing section 63c instructs the release (in-device unlock) of the in-device lock to the object managing section 63a.

Upon reception of the instruction of the in-device unlock from the high-precedence processing executing section 63c, the object managing section 63a rewrites the in-device lock identification flag of that data into an unlock state.

In this situation, the high-precedence processing executing section 63c notifies the manager system 4 which has issued the original request of the completion of the renewal processing.

In this example, data of the object managing table 630 is also stored in the object data base 64a of the maintenance service executing section 64. When data of the object managing table 630 is updated, the consistency between the object managing table and the object data base 64 is necessarily held. Correspondingly, the high-precedence processing executing section 63c has a function for notifying the maintenance service executing section 64 of the data renewal request upon the completion of the renewal processing of the object managing table 630.

In this situation, upon reception of the completion of the renewal processing from the maintenance service executing section 64, the low-precedence processing executing section 63d instructs the release of the out-of-device lock of the data to the object managing section 63a in the intervals of the processing of the high-precedence processing executing section 63c.

Figure 13:
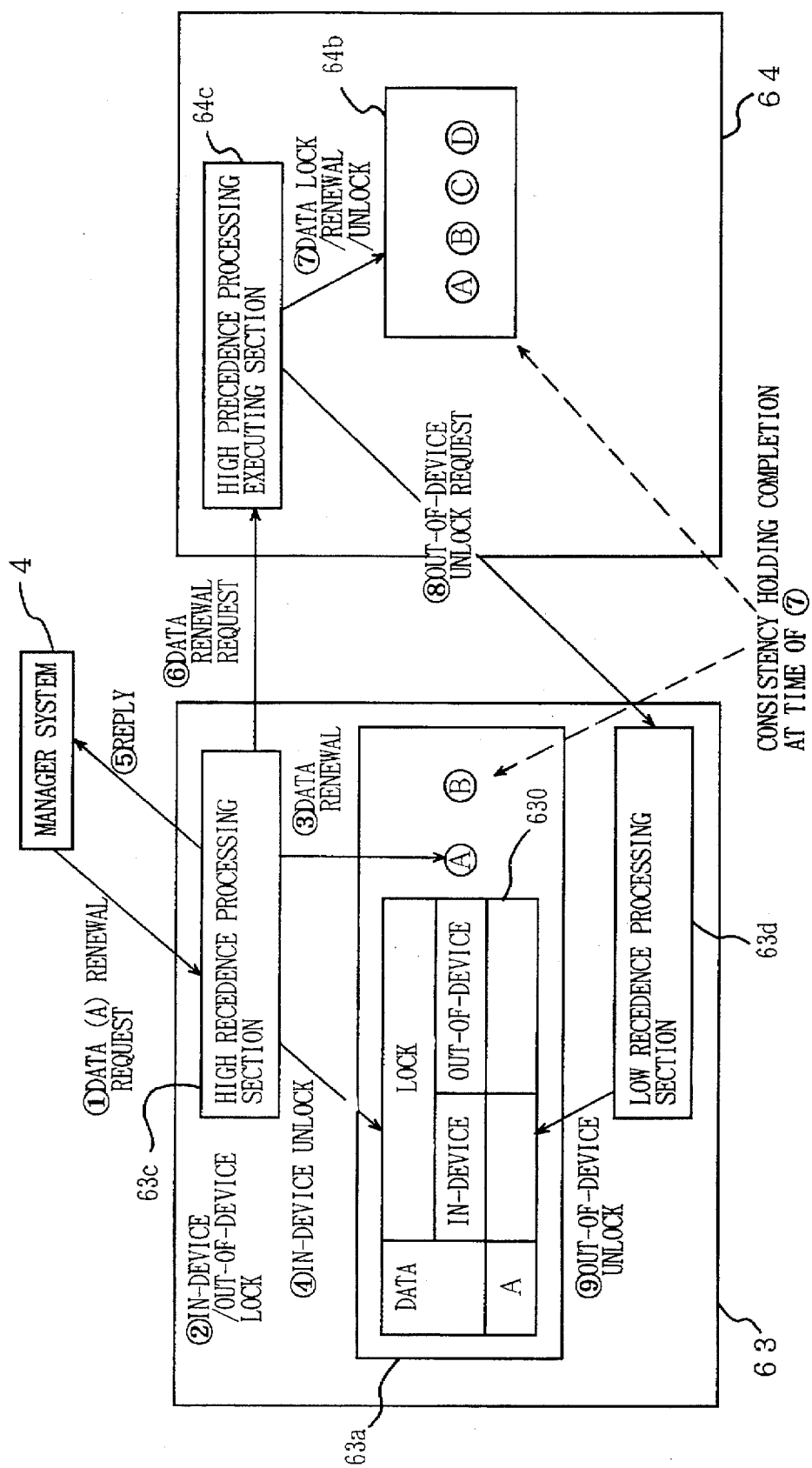
FIG. 13 is an explanatory diagram showing a data renewal processing in a communication service executing section.

FIG. 14 is a diagram showing the state transition of a lock identification flag of the object managing table in the operation of FIG. 13.

In an initial state (timing "1"), the in-device lock identification flag and the out-of-device lock identification flag represent an unlock state ("0").

Upon reception of the lock request from the high-precedence processing executing section 63c (timing "2"), the in-device lock identification flag and the out-of-device lock identification flag are rewritten into a lock state "1".

Subsequently, upon reception of the in-device unlock request from the high-precedence processing executing section 63c after the completion of data renewal processing (timing "4"), only the in-device lock identification flag is rewritten into an unlock state "0". In this situation, the out-of-device lock identification flag remains in the lock state "1".

Further, upon reception of the out-of-device unlock request from the low-precedence maintenance service executing section 64 after the completion of the data renewal in the maintenance service executing section 64 (timing "9"), the out-of-device lock identification lock is rewritten into the unlock state ("0").

(Structure of Maintenance Service Executing Section 64)

The maintenance service executing section 64 includes a data managing section 64b, a high-precedence processing section 64c, a low-precedence processing executing section 64c, and a data manager judging section 64e in addition to the structure of the foregoing first embodiment.

The high-precedence processing executing section 64c is designed to execute the processing requiring a high-speed property. Concretely, the low-precedence processing executing section 64d is equipped with a function for executing a data renewal request from the manager system 4. The low-precedence processing executing section 64d is equipped with a function for executing a plurality of processing in parallel as in the foregoing communication service executing section 63.

The data managing section 64b is equipped with a function for managing data of the object data base 64a. Concretely, the lock/unlock of data or rewriting of data is executed in accordance with an instruction from the precedence processing executing section 64c or the low-precedence processing executing section 64d.

The data manager judging section 64e has a function for discriminating whether data to be updated has been also stored in the object managing table 630 in the communication service executing section 63, or not, when it has received a data renewal request from the manager system 4.

Figure 15:
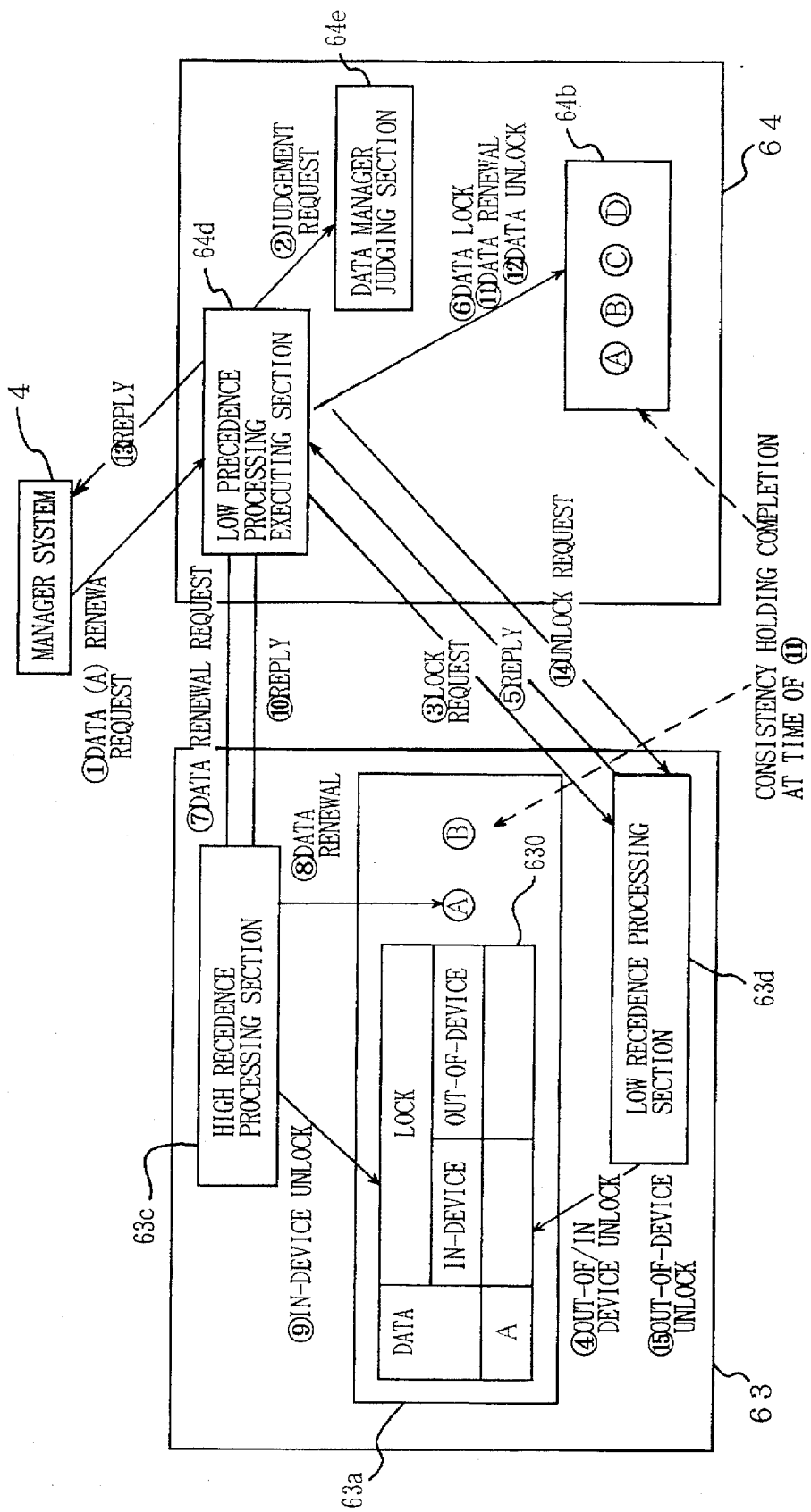
FIG. 15 is an explanatory diagram showing a data renewal processing in a maintenance service executing section.

Subsequently, a description will be given of the detailed functions of the foregoing respective sections with reference to FIG. 15.

Upon reception of a data renewal request from the manager system 4, the maintenance service executing section 64 starts the low-precedence processing executing section 64d.

The low-precedence processing executing section 64d has a function for allowing the data manager judging section 64e to discriminate whether data to be updated has been also stored in the object managing table 630 of the communication service executing section 63, or not.

In this situation, in the case where the data to be updated has been also registered in the object managing table 630, the low-precedence processing executing section 64d requests the low-precedence processing executing section 63d of the communication service executing section 63 to lock data.

Then, upon reception of a notice of a lock success from the low-precedence processing executing section 63d in the communication service executing section 63, the low-precedence processing executing section 64d instructs the data managing section 64d to lock data to be updated.

The data managing section 64b retrieves the object data base 64a and rewrites the lock identification flag of data to be updated into a lock state.

Upon recognition of the data lock, the low-precedence processing executing section 64d discriminates whether the control of the exchange is necessary or not. If the control of the exchange is necessary, the low-precedence processing executing section 64d transmits a control command to the exchange resource control section 7a, and after reception of a response thereto from the exchange resource control section 7a, requests the high-precedence processing executing section 63c of the communication service executing section 63 to execute the data renewal and the in-device unlock.

If the control of the exchange is unnecessary, the low-precedence processing executing section 64d requests the high-precedence processing executing section 63c of the communication service executing section 63 to execute the renewal of data and the in-device unlock.

Upon reception of the renewal completion of data from the high-precedence processing executing section 63c of the communication service executing section 63, the low-precedence processing executing section 64d requests the data managing section 64d to execute the renewal of data.

The data managing section 64b updates date of the object data base 64a in accordance with an instruction from the low-precedence processing executing section 64d.

Upon recognition of the renewal completion of the object data base 64a, the low-precedence processing executing section 64d instructs the data managing section 64b to release the data lock.

The data managing section 64b retrieves the object data base 64a in accordance with an instruction from the low-precedence processing executing section 64d and rewrites the lock identification flag of data into an unlock state.

Further, the low-precedence processing executing section 64c requests the low-precedence processing executing section 63d of the communication service executing section 63 to release the out-of-device lock.

FIG. 16 is a diagram showing the state transition of a lock identification flag of an object managing table 630 in the foregoing operation.

In other words, the in-device lock identification flag and the out-of-device lock identification lock are in an unlock state "0" during an initial state (timing "1").

Then, a lock request issues from the maintenance service executing section 64 to the communication service executing section 63, and when the low-precedence processing executing section 63d executes the lock request (timing "4"), the in-device lock identification flag and the out-of-device lock identification flag are rewritten into the lock state "1".

Moreover, after the high-precedence processing executing section 63c executes the renewal processing of data in accordance with an instruction from the maintenance service executing section 64 (timing "9"), only the in-device lock identification flag is rewritten into the unlock state "0".

Also, upon reception of the out-of-device unlock request from the maintenance service executing section 64 (timing "15"), the out-of-device lock identification flag is rewritten into the unlock state "0".

Here, a description will be given of a method of designating data to be updated.

Figure 17:
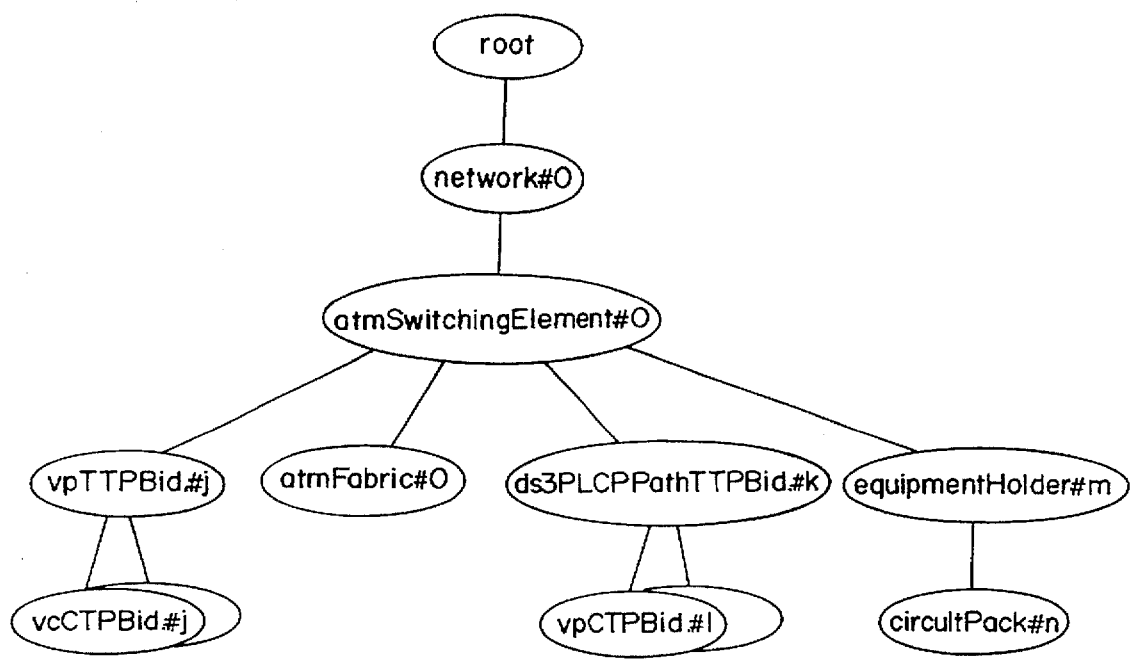
FIG. 17 is a diagram showing one example of a data structure of an object data base.
Figure 18:
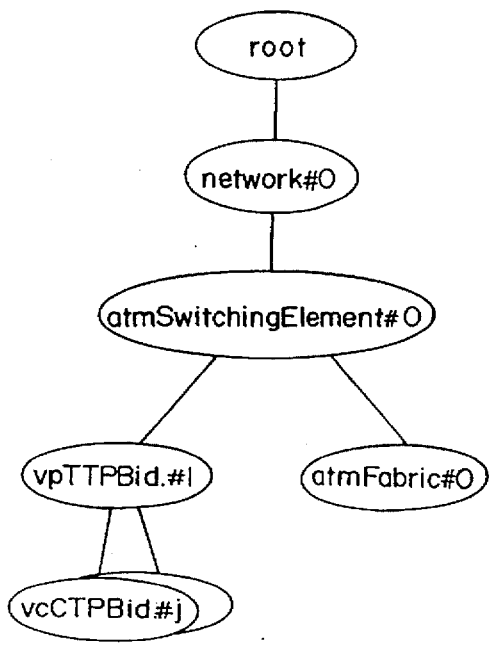
FIG. 18 is a diagram showing one example of a data structure of an object managing table.

FIG. 17 is a diagram showing a data structure of an object data base 64a in the case where a CMIP (common management information protocol) is used as the protocol of the interface end portion 60. FIG. 18 is a diagram showing a data structure of an object managing table 630 in correspondence with FIG. 17. Here, the object managing table 630 stores those data including an upper and lower positional relationship thereof therein in the table format.

The respective data in the figure are of data in the form of MO (managed object).

Here, as a method of designating data to be updated, the scope condition and the filter condition of a CMIP can be used.

The scope condition is directed to a method of designating a fulcrum constituting a tree structure and hierarchical number from the fulcrum to data to be updated. In other words, in FIG. 17, in the case of designating data "atm Switching Element #0", data "root" which is a fulcrum and the hierarchical number "2" from the data "root" are designated.

The filter condition is directed o a method of designating conditions of data to be updated. In other words, in FIG. 18, "vp TTPBid. #1" and "atm Fabric #0" are stored under three hierarchies of data "root". In this situation, in the case of designating "vp TTPBid. #1", conditions of this data are designated. For example, in the case of designating "vp TTPBid. #1", a data type "VPTTPId" and a value "5" of this data type are designated.

Figure 19:
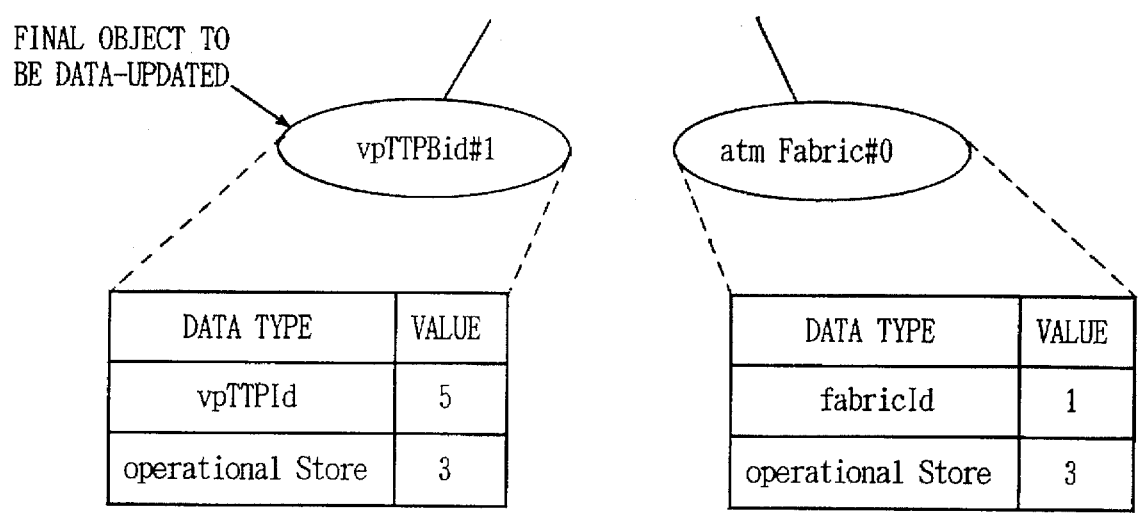
FIG. 19 is an explanatory diagram showing a designated procedure of an object.

On the other hand, in the case of designating "atm Fabric #0", a value "0" of the data type "fabric Id" of that data is designated (refer to FIG. 19).

In this manner, data to be updated can be designated by using the scope conditions and the filter conditions together even though a name (for example, "vpTTPBid#1", etc.) of data to be updated is not directly designated.

Hereinafter, a description will be given of the data renewal processing of the communication service executing section 63 and the maintenance service executing section 64.

(Operation of Communication Service Executing Section 63)

Figure 20:
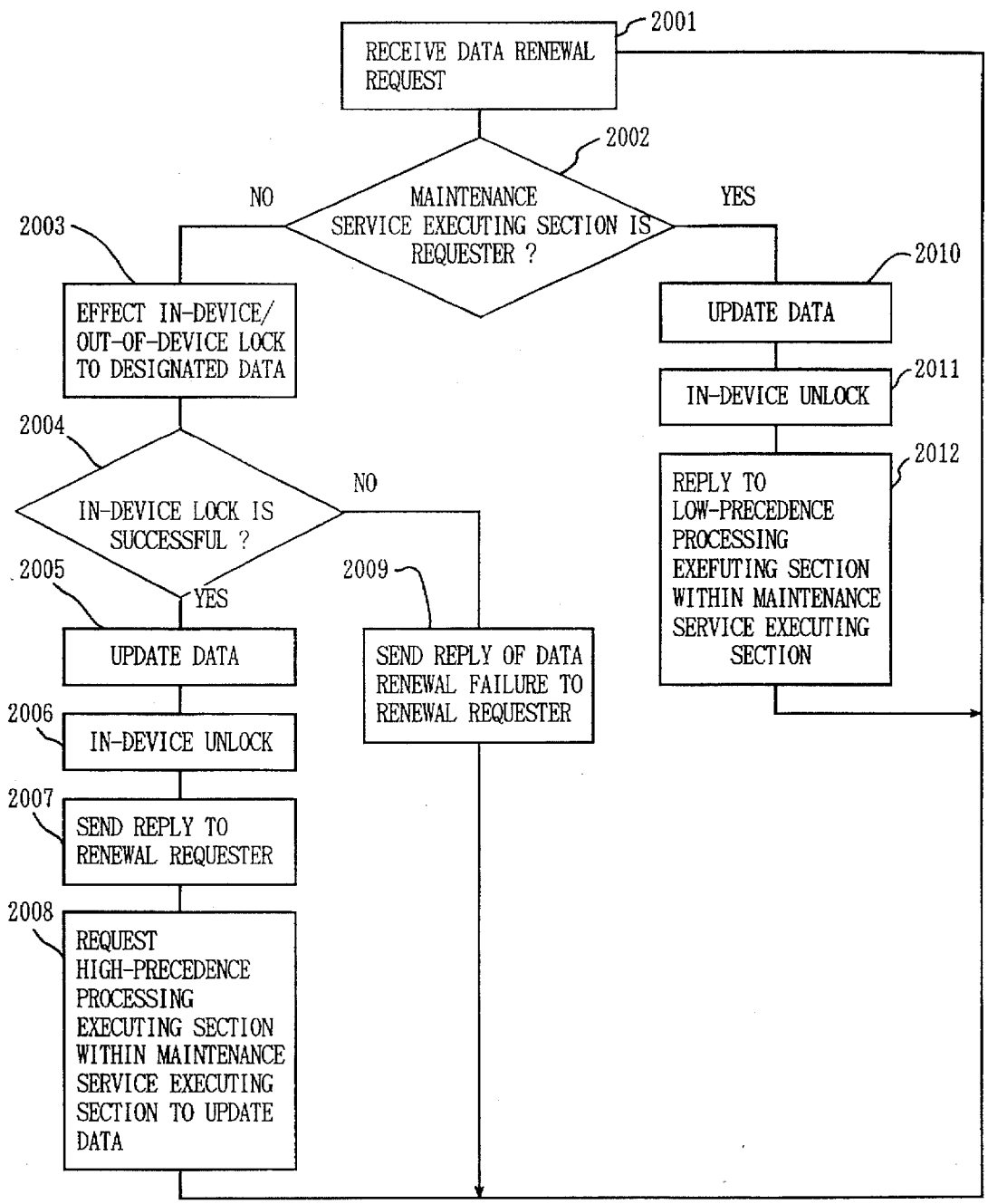
FIG. 20 is a flowchart showing the operation of a high-precedence processing unit in a communication service executing section.

First, an operation of the high-precedence processing executing section 63c will be described with reference to FIG. 20.

Upon reception of the data renewal request (Step 2001), the communication service executing section 63 starts the high-precedence processing executing section 63c.

The high-precedence processing executing section 63c discriminates whether the requester for a data renewal request is the maintenance service executing section 64 or the manager system 4 (Step 2002).

When the requester for the data renewal request is the manager system 4, the high-precedence processing executing section 63c discriminates data to be updated. Then, the high-precedence processing executing section 63c notifies the object managing section 63a of a data lock request (Step 2003).

Referring to a lock identification flag of the object managing table 630, the object managing section 63a discriminates whether the data is in the in-device lock state, or not (Step 2004). Here, if the data is in the in-device unlock state, the object managing section 63a rewrites the lock identification flag of the data into the lock state. Moreover, the object managing section 63a notifies the high-precedence processing section 63c that the data lock has succeeded.

The high-precedence processing executing section 63c transmits a resource control command to the exchange resource control section 7a if necessary, and instructs the object managing section 63a to execute the renewal of data after reception of a reply thereto.

The object managing section 63a updates data in accordance with an instruction from the high-precedence processing executing section 63c (Step 2005), and notifies the high-precedence processing executing section 63c of the completion of the data renewal.

Upon the recognition of the completion of the data renewal, the high-precedence processing executing section 63c instructs the object managing section 63a to execute the unlock of data. The object managing section 63a gains access to the object managing table 630 and rewrites the lock identification flag of the data into an unlock state (Step 2006).

In this situation, the high-precedence processing executing section 63c transmits the completion of the data renewal processing to the manager system 4 (Step 2007).

Further, the high-precedence processing executing section 63c transfers a data renewal request to the high-precedence processing executing section 64c of the maintenance service executing section 64 (Step 2008).

When the data to be updated has already been in the in-device lock in the foregoing step 2004, the high-precedence processing executing section 63c notifies the manager system 4 which is a renewal requester that the data renewal has failed (Step 2009). In this situation, it may wait for the in-device unlock.

Further, in the foregoing step 2002, if the data requester is of the maintenance service executing section 64, the low-precedence processing executing section 63d succeeds in the in-device lock on the basis of the request of the maintenance service executing section 64 (this operation will be described later), and the high-precedence processing executing section 63c starts the object managing section 63a to execute the date renewal processing (Step 2010).

Upon the completion of the data renewal processing, the high-precedence processing executing section 63c instructs the object managing section 63a to release the data lock.

The object managing section 63a gains access to the object managing table 630 and rewrites the in-device lock identification flag into the unlock state (Step 2011).

Upon the releasing of the in-device lock, the high-precedence processing executing section 63c notifies the low-precedence processing executing section 64d of the maintenance service executing section 64 of the completion of the data renewal processing (Step 2012).

Figure 21:
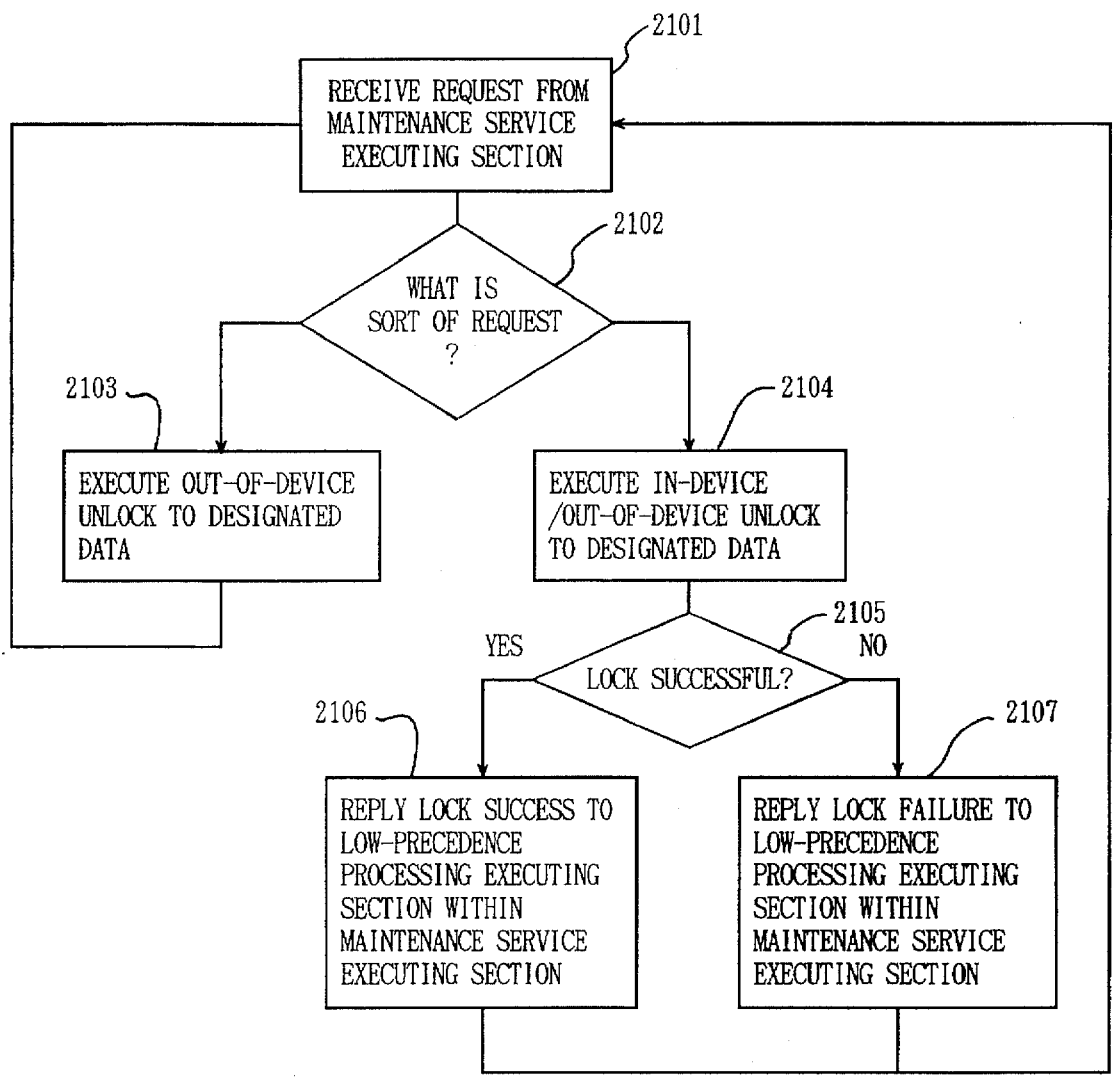
FIG. 21 is a flowchart showing the operation of a low-precedence processing unit in the communication service executing section.

Subsequently, a description will be given of the operation of the low-precedence processing executing section 63d with reference to FIG. 21.

Upon reception of a processing request from the maintenance service executing section 64 (Step 2101), the low-precedence processing executing section 63d of the communication service executing section 63 discriminates whether the processing request is of a data lock request or a data unlock request (Step 2102).

In this situation, the data unlock request is of a request for releasing the out-of-device lock of the object managing table 630. In other words, upon the completion of the data renewal of the object managing table 630, the communication service executing section 63 releases only the in-device lock. This causes the out-of-device lock to be held. Accordingly, the maintenance service executing section 64 requests the release of the out-of-device lock after the execution of the date renewal request from the communication service executing section 63.

In step 2102, if the processing request is of a data unlock request, the low-precedence processing executing section 63d discriminates data to be updated. Then, the low-precedence processing executing section 63d starts the object managing section 63a when the processing of the high-precedence processing executing section 63c is interrupted or completed.

The object managing section 63a retrieves the object managing table 630 and rewrites the out-of-device lock identification flag of data to be updated into the unlock state Step 2103).

Also, in step 2102, if the processing request is of a data lock request, the low-precedence processing executing section 63d instructs the object managing section 63a to execute the data lock when the loads of the object managing section 63a is low (Step 2104).

The object managing section 63a retrieves the object managing table 630 and refers to the in-device lock identification flag and the out-of-device lock identification flag of the data to be updated. Thereafter, the object managing section 63a discriminates whether both of the in-device lock identification flag and the out-of-device lock identification flag are in the unlock state, or not (Step 2105).

If both the flags indicate the unlock state, the object managing section 63a rewrites both the flags into the lock state.

If the lock processing of the data to be updated has succeeded, the low-precedence processing executing section 63d notifies the low-precedence processing executing section 64d of the maintenance service executing section 64 of the success of the lock processing (Step 2106).

In step 2105, if any one of the in-device lock identification flag and the out-of-device lock identification information is in the lock state, the low-precedence processing executing section 63d notifies the low-precedence processing executing section 64d of the maintenance service executing section 64 of the failure of the lock processing (Step 2107). It may wait for the success of lock.

Subsequently, a description will be given of an operation of the maintenance service executing section 64.

(The Operation of Maintenance Service Executing Section 64)

Figure 22:
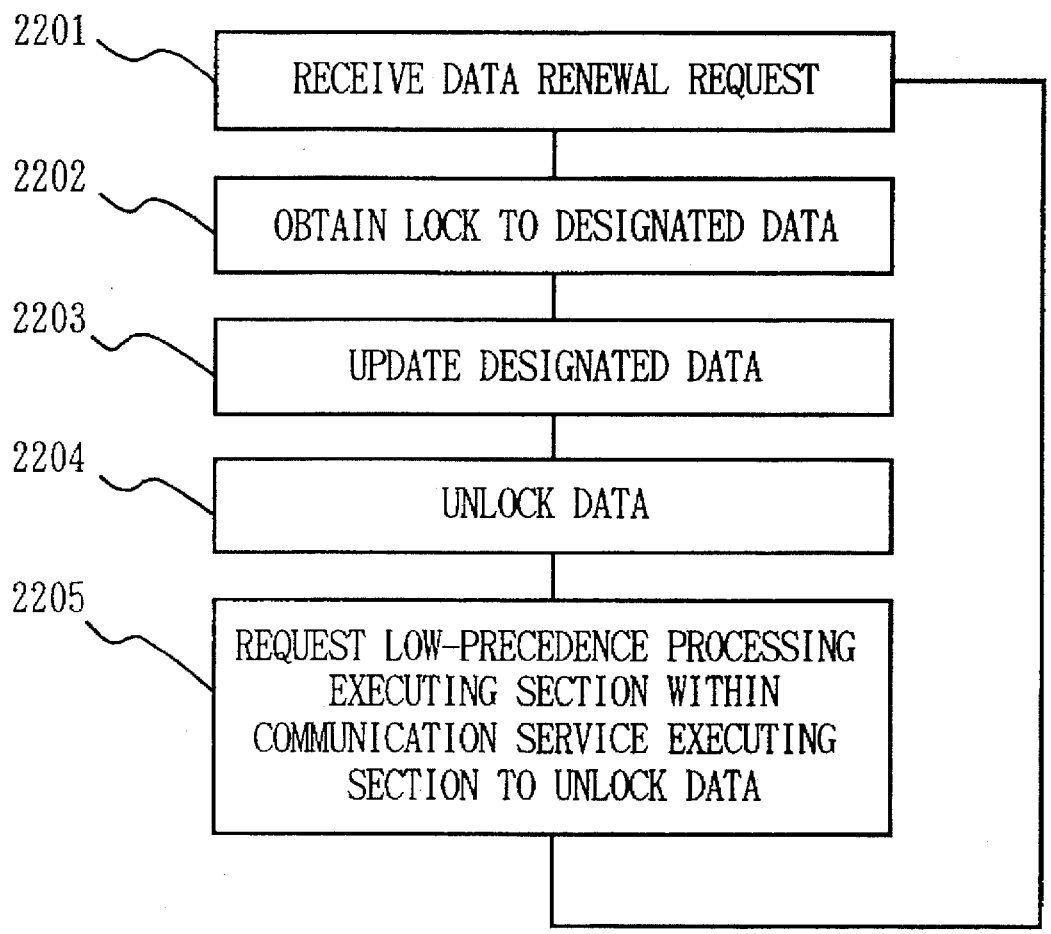
FIG. 22 is a flowchart showing the operation of a high-precedence processing unit in the maintenance service executing section.

First of all, the operation of the high-precedence processing executing section 64c will be described with reference to FIG. 22.

The high-precedence processing executing section 64c is started when receiving a data renewal request from the communication service executing section 63.

Upon reception of the data renewal request from the communication service executing section 63 (Step 2201), the high-precedence processing executing section 64c discriminates the data to be updated. Then, the high-precedence processing executing section 64c instructs the data managing section 64b to execute the data lock.

The data managing section 64b retrieves the object data base 64a and rewrites the lock identification flag of the data to be updated into the lock state (Step 2202).

Furthermore, the high-precedence processing executing section 64c instructs the data managing section 64b to execute the data renewal.

The data managing section 64b updates data of the object data base 64a in accordance with an instruction from the high-precedence processing executing section 64c (Step 2203).

Upon the completion of data renewal processing, the high-precedence processing executing section 64c instructs the data managing section 64b to release the data lock.

The data managing section 64b rewrites a data lock identification flag of the object data base 64a into the unlock state in accordance with an instruction from the high-precedence processing executing section 64c (Step 2204).

The high-precedence processing executing section 64c instructs the low-precedence processing executing section 63d of the communication service executing section 63 to release the out-of-device lock of the data (Step 2205).

Next, an operation of the low-precedence processing executing section 64d will be described with reference to FIG. 23.

The maintenance service executing section 64 starts the low-precedence processing executing section 64d when receiving a data renewal request from the manager system 4.

Upon reception of the data renewal request from the manager system 4 (Step 2301), the low-precedence processing executing section 64d requests the data manager judging section 64e to discriminate whether data to be updated has been also stored in the object managing table 630, or not (Steps 2302 and 2303).

In this case, when the data to be updated has been stored in the object managing table 630, the low-precedence processing executing section 64d requests the low-precedence processing executing section 63d of the communication service executing section 63 to lock data (Step 2304).

Upon reception of a notice of notice of the data lock from the low-precedence processing executing section 63d of the communication service executing section 63 (Steps 2305 and 2306), the low-precedence processing executing section 64d transmits a resource control command to the exchange resource control section 7a if necessary, and after receiving a reply thereto, requests the high-precedence processing executing section 63c of the communication service executing section 63 to execute the data renewal (Step 2307).

Upon reception of a notice of completion of the data renewal from the communication service executing section 63 (step 2308), the low-precedence processing executing section 64d instructs the data managing section 64b to execute the data renewal.

The data managing section 64b gains access to the object data base 64b and rewrites data to be updated (Step 2309). Upon completion of the data renewal processing, the low-precedence processing executing section 64d requests the low-precedence processing executing section 63d of the communication service executing section 63 to release the out-of-device lock (Step 2310).

Furthermore, the low-precedence processing executing section 64d transmits the completion of the renewal processing to the manager system 4 (Step 2311).

In the foregoing step 2303, when data to be updated has not been stored in the object managing table 630, the low-precedence processing executing section 64d instructs the data managing section 64b to lock the data.

The data managing section 64b gains access to the object data base 64a and rewrites the lock identification flag of data to be updated into the lock state (Step 2312).

The low-precedence processing executing section 64d transmits a resource control command to the exchange resource control section 7a if the control of the exchange is necessary, and after receiving its reply, instructs the data managing section 64b to execute the data renewal (Step 2313).

After the completion of data renewal processing, the low-precedence processing executing section 64d instructs the data managing section 64b to release the data lock.

The data managing section 64b gains access to the object data base 64a and rewrites the lock identification flag of data to be renewed into the unlock state (Step 2314).

Then, the low-precedence processing executing section 64d notifies the manager system 4 of the completion of the renewal processing (Step 2311).

Moreover, in the foregoing step 2305, upon reception of a notice of failure of the lock processing from the communication service executing section 63, the low-precedence processing executing section 64d notices the manager system 4 of a failure of the data renewal processing (Step 2315).

In the third embodiment, data lock/unlock information is registered in the object managing table, however, the object managing section 63a may hold the data lock/unlock information, individually. Similarly, the data lock/unlock information may be registered within the object data base, or may be held by the data managing section 64b, individually.

As described above, according to the third embodiment, the processing of the communication service executing section requiring processing in real time is precedent to the processing of the maintenance service executing section so that the communication service executing section can be processed at a high speed. Further, in the case of updating data which is redundantly managed by the object data base and the object managing table, the consistency of both the data can be ensured.

(Fourth Embodiment)

Figure 24:
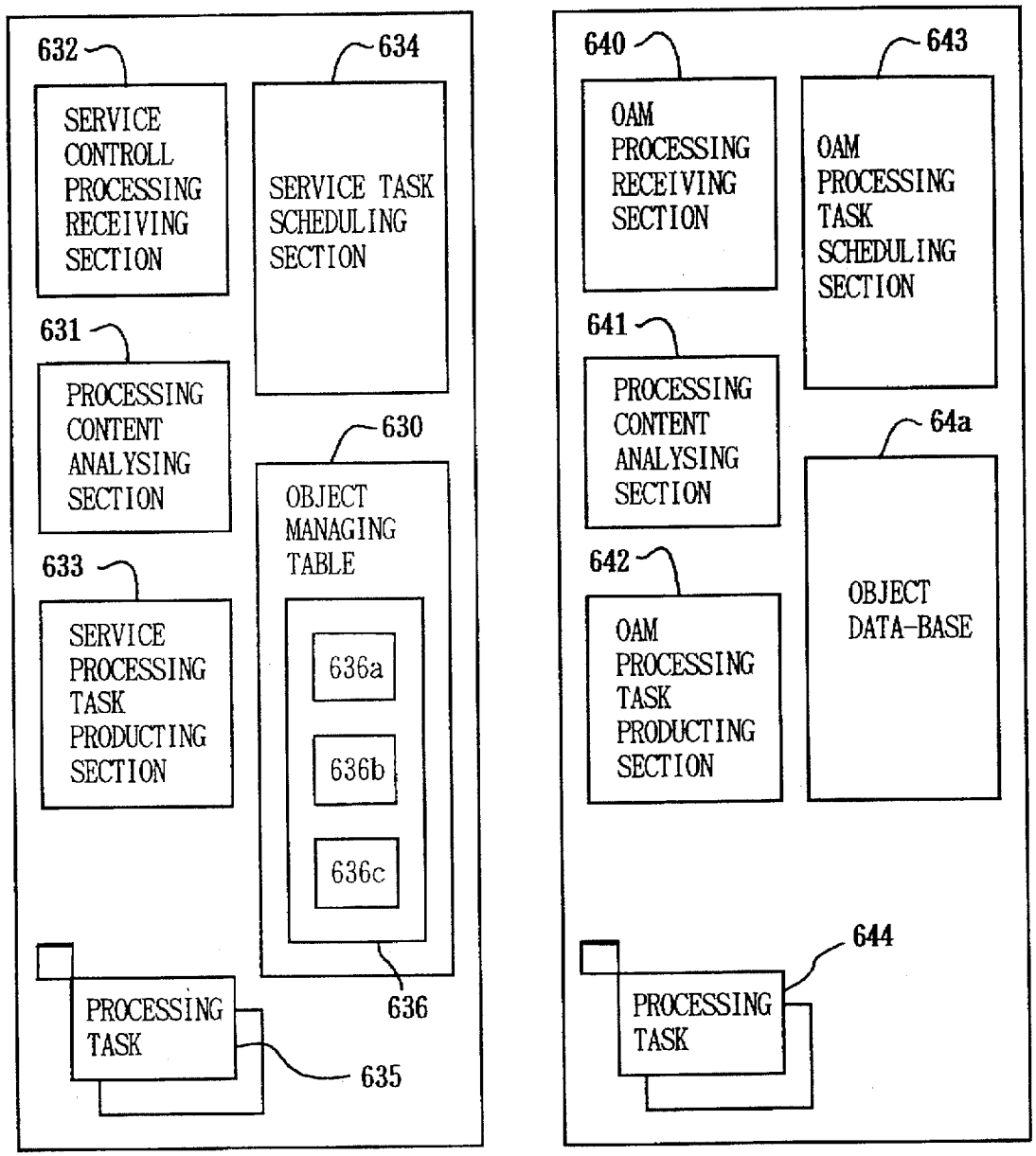
FIG. 24 is a block diagram showing the respective functional structures of an operation processing section in accordance with a fourth embodiment of the present invention.

A description will be given of the respective functional structures of the operation processing section 62 in accordance with a fourth embodiment of the present invention with reference to FIG. 24.

As the protocol of the interface end portion 60 in accordance with the fourth embodiment, a CMIP is used.

The operation processing section 62 is equipped with the communication service executing section 63 and the maintenance service executing section 64 as in the foregoing second embodiment.

(Structure of Communication Service Executing Section 63)

The communication service executing section 63 of the fourth embodiment includes an object managing table 630, a processing content analyzing section 631, a service control processing receiving section 632, a service processing task producing section 633, and a service task scheduling section 634.

The service control processing receiving section 632 is equipped with a function for receiving a processing request from the manager system 4.

The processing content analyzing section 631 analyzes the processing request received by the service control processing receiving section 632 to discriminate an object name and a processing sort of an object (MO) to be processed. In the case of using the CMIP as the protocol of the interface end portion 60 as in the foregoing third embodiment, a processing request includes a class name, an object identifier, a command sort, the parameters of the processing contents and so on of an object to be instructed. The commands are of 6 kinds of processing commands including an M-CREATE for instructing the generation of an object, an M-DELETE for instructing the deletion of the object, an M-SET for instructing the change of attributes within the object, an M-GET for instructing the read of the attributes within the object, an M-ACTION for instructing a predetermined operation to the object, and an M-EVENT-REPORT for reporting the appearance or statistic of an event within the object.

Further, the processing content analyzing section 631 judges the precedence degree of a processing request with reference to a precedence degree table registering table 636 to be described later on the basis of the object name and the processing sort. The processing content analyzing section 631 has a function for notifying the service processing task producing section 633 of the precedence degree in addition to the processing request.

The service processing task producing section 633 produces a processing task 635 for executing the processing request and notifies the service task scheduling section 634 of the processing task 635 and the precedence degree.

The service task scheduling section 634 determines the executing order of the processing task 635 on the basis of the precedence degree. In this situation, there is a case where the processing of the processing task 635 is interrupted because of waiting for a reception of information from other devices or waiting for a reply from other devices. For example, in the case where the communication service executing section 63 transmits a command to the exchange 3 and waits for the execution result from the exchange 3, the execution of the processing task 635 is interrupted. Then, the communication service executing section 63 restarts the execution of the processing task 635 which has been interrupted at the time of receiving the execution result from the exchange 3. In general, the processing restarted after the interruption is finished in a short period of time. In view of this fact, the service scheduling section 634 may set the precedence degree of the processing task 635 which has been interrupted to be higher than that of the other processing task 635.

The object managing table 630 stores an object identifier and a resource identifier as well as the precedence degree registering table 636.

The precedence degree registering table 636 is provided with an object attribute table 636a, an object precedence degree table 636b, and an action precedence degree table 636c.

The object attribute table 636a stores the object identifier, the object name and the precedence degree attribute data therein (refer to FIG. 25).

The precedence degree attribute data is of parameter information for determining the precedence degree of a command to the respective objects.

The object precedence degree table 636b stores the precedence degree of a command to the respective objects every precedence degree attribute data. Concretely, the object precedence degree table 636b stores the precedence degree of a command except for the M-ACTION and the action precedence degree attribute data of the M-ACTION command therein. The action precedence degree attribute data is of parameter information for deciding the precedence degree of the M-ACTION to the respective objects (refer to FIG. 26).

The action precedence degree table 636c stores the contents of the M-ACTION and the precedence degree associated with the respective contents every precedence degree attribute data (refer to FIG. 27).

Associated with the table thus constituted, the processing content analyzing section 631 has a function for discriminating, when receiving a processing request, an object name and a command sort from the processing request. The processing content analyzing section 631 retrieves the object attribute table 636a on the basis of the object name and reads a precedence degree attribute data. The processing content analyzing section 631 discriminates whether the processing command is of an M-ACTION, or not. In the case where the processing command is not an M-ACTION command, the processing content analyzing section 631 reads the precedence degree of the processing degree from the object precedence degree table 636b. In the case where the processing command is an M-ACTION command, the processing content analyzing section 631 reads the action precedence degree attribute data from the object precedence table 636b while extracting the contents of the action from the processing command. Then, the processing content analyzing section 631 gains access to the action precedence degree table 636c on the basis of the action precedence degree attribute data and the action contents to read the precedence degree of the processing command.

(Structure of Maintenance Service Executing Section 64)

The maintenance service executing section 64 may be called an OAM (operation, administration and maintenance) processing section or an OA & P (operation, administration, maintenance and provision) processing section. The maintenance service executing section 64 includes an object data base 64a, an OAM processing receiving portion 640, a processing content analyzing section 641, an OAM processing task producing section 642 and an OAM processing task scheduling 643.

The OAM processing receiving section 640 receives a processing request from the manager system 4.

The processing content analyzing section 641 has a function for judging a name of an object and the sort of a command from the processing request. Then, the processing content analyzing section 641 has a function for retrieving a precedence degree registering table not shown on the basis of a name of the object and the sort of a command to judge the precedence degree of the processing request.

The OAM processing task producing section 642 has a function for producing a processing task 644 on the basis of a name of the object and the sort of a command.

The OAM processing task scheduling 643 has a function for determining the executing order of the processing tasks produced by the OAM task producing section 642 in accordance with the precedence degree.

In the object data base 64a, the precedence degree registering table not shown is stored as in the communication service executing section 63.

Hereinafter, a description will be given of an operation of the communication service executing section 63. The operation of the maintenance service executing section 64 is similar to that of the communication service executing section 63, and therefore its description will be omitted.

(Operation of Communication Service Executing Section 63)

When the manager system 4 transmits a processing request of M-CREATE (vcCTP, DNxxx, band, QOS, ...) conforming to the CMIP agreement to the agent system 6a, the interface end portion 60 decodes the processing request and discriminates whether the request is a processing request relating to communication or a processing request relating to maintenance/management. If it is a processing request relating to communication, the interface end portion 60 transfers the processing request to the communication service executing section 63. If it is a processing request relating to maintenance/management, the interface end portion 60 transfers the processing request to the maintenance service executing section 64.

In this case, since the processing request of M-CREATE is a processing request relating to communication, the interface end portion 60 transfers the processing request of M-CREATE to the communication service executing section 63.

Upon reception of the processing request of M-CREATE, the service control processing receiving section 632 of the communication service executing section 63 notifies the processing content analyzing section 631 of the processing request of M-CREATE.

Figure 28:
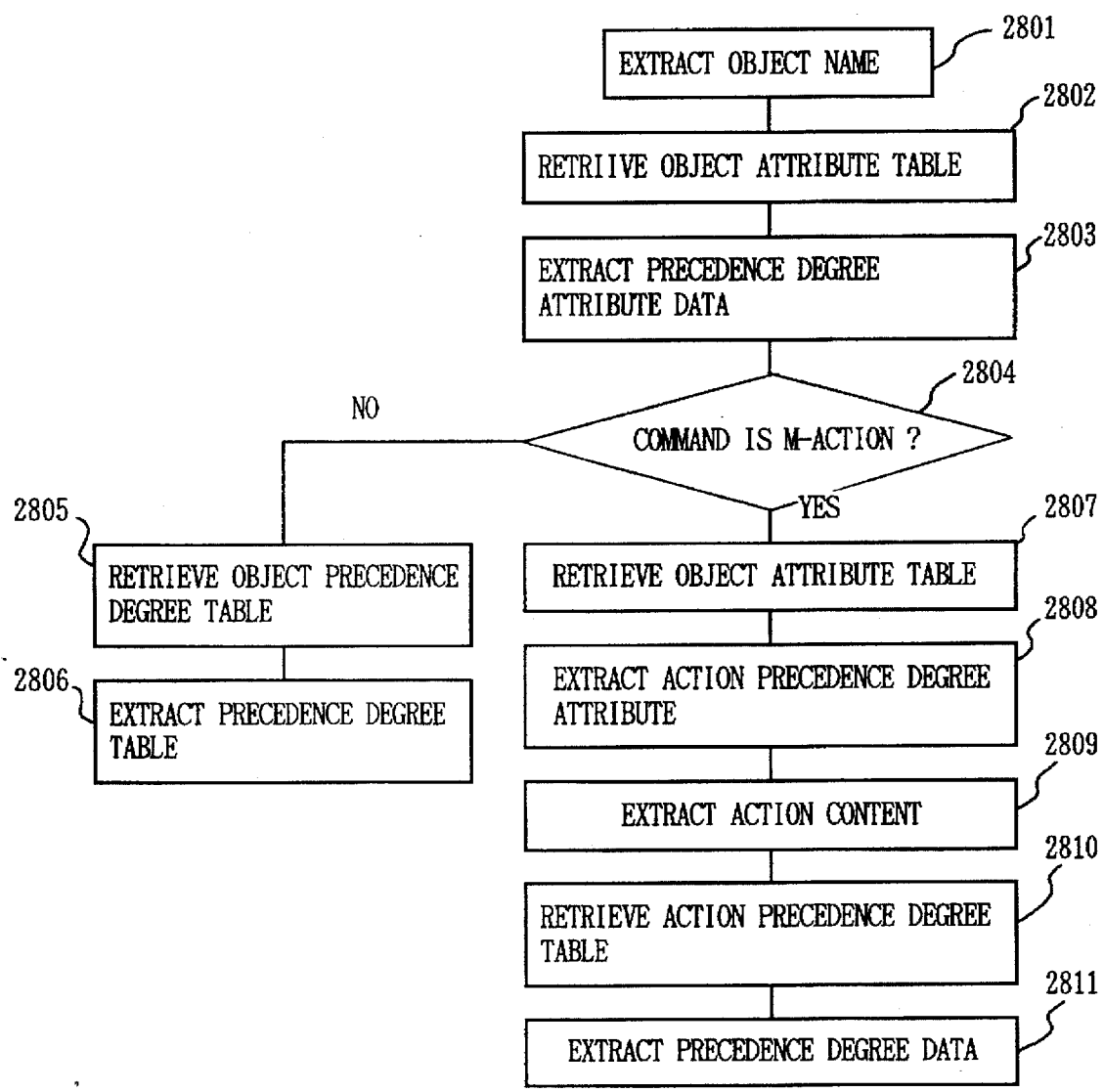
FIG. 28 is a flowchart showing the operation of a communication service executing section.

The processing content analyzing section 631 analyzes the processing request of M-CREATE and extracts a name of the object (Step 2801, FIG. 28).

The processing content analyzing section 631 gains access to the object attribute table 636a of the precedence degree registering table 636 on the basis of the name of the object (Step 2802). The processing content analyzing section 631 reads the precedence degree attribute data corresponding to the name of the object (Step 2803).

Subsequently, the processing content analyzing section 631 extracts the sort of commands from the processing request of M-CREATE to discriminate whether it is of M-ACTION, or not (Step 2804).

Since the command sorts of the processing request M-CREATE is not of M-ACTION, the processing content analyzing section 631 gains access to the object precedence table 636b on the basis of the precedence degree attribute data (Step 2805).

Subsequently, the processing content analyzing section 631 reads the precedence degree of the processing request from the object precedence degree table 636b (Step 2806), and notifies the service processing task producing section 633 of the processing request and the precedence degree.

If it is judged that the sort of the processing command is of M-ACTION in the foregoing step 2804, the processing content analyzing section 631 gains access to the object precedence degree table 636b on the basis of the precedence degree attribute data (Step 2807).

Then, the processing content analyzing section 631 reads the action precedence degree attribute data from the object precedence degree table 636b (Step 2808), and simultaneously reads the contents of action from the processing request of M-ACTION (Step 2809).

The processing content analyzing section 631 gains access to the action precedence degree table 636c on the basis of the contents of action and the action precedence degree attribute data (Step 2810). The processing content analyzing section 631 reads the precedence degree of the processing request from the action precedence degree table 636c (Step 2811), and notifies the service processing task producing section 634 of the precedence degree.

The service processing task producing section 633 produces the processing task 635 corresponding to the processing request, and notifies the service task scheduling section 634 of the processing task 635 and the precedence degree.

The service task scheduling section 634 determines the executing order of the processing task 635 in accordance with the precedence degree.

The processing task 635 executes the production or registration of MO, and gains access to the resource within the exchange 3 of the network element correspondingly. For example, the processing task 635 requests the exchange 3 to capture a virtual path identifier VPI and the virtual channel identifier VCI. Then, the processing task 635 interrupts the processing and waits for a reply from the exchange 3.

Upon reception of the reply from the exchange 3, the service task scheduling 634 sets the precedence degree of the processing task 635 to be higher than that of other processing tasks. As a result, the processing of the processing task 635 can be restarted in precedence to other processing tasks. The processing task 635 the processing of which has been restarted produces a message to be transmitted to the manager system 4 in accordance with a reply from the exchange 3. The message is transmitted through the interface end portion 60 to the manager system 4.

The processing task the process of which has been interrupted because of waiting for a reply may be finished. In this case, the communication service executing section 63 is designed so as to provide a response message producing section 637.

The response message producing section 637 has a function for producing a message to be transmitted to the manager system 4 instead of the processing task waiting for a reply or a reception.

Figure 29:
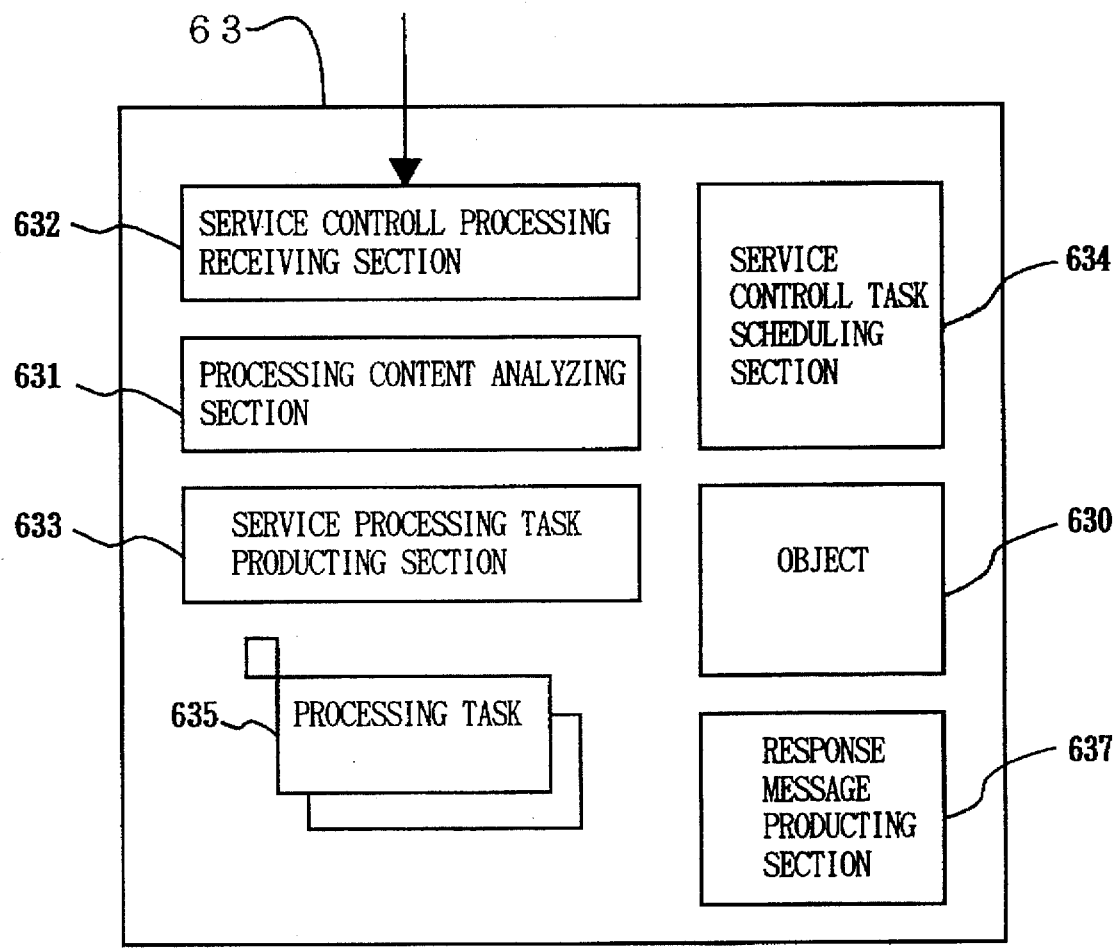
FIG. 29 is a diagram showing another structure of a communication service executing section.

Concretely, upon recognition of the processing task the processing of which has been interrupted because of waiting for a reply or the like, the response message producing section 637 finishes the processing task. Then, upon reception of a reply from the network resource, the response message producing section 637 produces a message to be transmitted to the manager system 4 on the basis of that reply. That message is transmitted through the interface end portion 60 to the manager system 4 (refer to FIG. 29). As a result, the processing delay due to waiting for a reply, a reception or the like can be restrained.

Furthermore, if a relative number between the number of the processing tasks within the communication service executing section 63 and the number of the processing tasks within the maintenance service executing section 64 is increased, a balance in load between the communication service executing section 63 and the maintenance service executing section 64 is liable to be lost. On the contrary, the executing scheduling section 61 may provide a function for monitoring the load states of the communication service executing section 63 and the maintenance service executing section 64 to change the precedence degree of the communication service executing section 63 and the maintenance service executing section 64. In other words, the precedence degree of the maintenance service executing section 64 is normally set to be lower than the precedence degree of the communication service executing section 63. However, if the load of the maintenance service executing section 64 is remarkably larger than the load of the communication service executing section 63, the executing scheduling section 61 makes the precedence degree of the maintenance service executing section 64 larger than that of the communication service executing section 63.

According to the network element managing system of the present invention, a processing request relating to communication can be executed at a high speed through a system for maintaining and managing the network elements such as an exchange or a telecommunication line. As a result, the system which flexibly copes with a variety of the communication services and effectively executes the communication processing can be provided.

Further, the communication control section as well as the management control section can analyze the processing request and determine an optimum precedence order in accordance with the attribute of an object to be processed or the attribute of the processing request. As a result, the system which can effectively execute the processing without any dependency on the protocol of the interface and flexibly cope with a variety of services can be provided.

Still further, in the case of updating data which is redundantly managed by the communication control section and the management control section, the consistency of data between the communication control section and the management control section can be ensured, thereby realizing the renewal processing at a high speed and with efficiency.

What is claimed is:

1. A network element managing system comprising:

manager means for managing a plurality of network elements including an exchange or a telecommunication line which constitutes a telecommunication network to transmit a processing request from a specified subscriber to a corresponding network element;

agent means for analyzing the processing request transmitted from said manager means to discriminate whether the processing request is a processing request relating to maintenance/management of the network or a processing request relating to a communication processing, said agent means converting the processing request into a command form which is capable of being processed by the network element to transmit the converted processing request to the network element and to transmit the execution result of said processing request to said manager means if the processing request is of the processing request relating to the communication processing;

wherein said agent means includes a scheduling section for delivering data with respect to said manager means to discriminate whether the communication processing received by said manager means is a processing request relating to maintenance/management of the network or a processing request relating to the communication processing, if said processing request is of the processing request relating to the communication processing, said scheduling section assigning a precedence order higher than that of the processing request relating to the maintenance/management to the processing request, and if said processing request is of the processing request relating to the maintenance/management of the network, said scheduling section assigning a precedence order lower than that of processing request relating to the communication processing to the processing request; and an operation processing section which executes said processing request according to a precedence order determined by said scheduling section if said processing request is of a processing request relating to the maintenance/management of the network, converts said processing request into a command form which is capable of being processed by the network element to allow the network element to execute the processing request after conversion according to a precedence order determined by said scheduling section, and to transmit the execution result to said manager means; and wherein said operation executing section includes communication control section which allows said network element to execute the processing request relating to the communication processing to transmit the execution result to said manager means; and a management control means for executing the processing request relating to the maintenance/management of said network to transmit the execution result to said manager means.

2. A network managing system as claimed in claim 1, wherein said management control means includes an object data storing section for storing a resource identifier for specifying the respective resources within said network, an object identifier where the respective resources have been converted into logic models and attribute data of the respective resources, and wherein said management control section executes a step of extracting the object identifier of the resource to be processed from the processing request; a step of retrieving said object data storing section on the basis of said object identifier to read the attribute information of said resource; and a step of transmitting said attribute information to said manager means.

3. A network element managing system as claimed in claim 2, wherein said object data storing section has an attribute information including the operation history of said respective resources.

4. A network element managing system as claimed in claim 2, wherein said object data storing section includes a precedence degree table for storing a precedence degree which determines the execution order of the processing request to the respective objects, and wherein said management control section including a processing content analyzing section, upon receiving the processing request relating to maintenance/management from said manager means, for detecting an object identifier of the object to be processed from the processing request and retrieving said precedence degree table on the basis of the object identifier to judge the precedence degree of said processing request; a processing task producing section for producing the processing task which executes said processing request; and a processing task scheduling section for starting said processing task on the basis of the precedence degree which is judged by said processing content analyzing section.

5. A network element managing system as claimed in claim 4, wherein said processing task scheduling section, when restarting the processing of the processing task which has been interrupted, sets the execution order of said processing task to be higher than that other processing tasks.

6. A network element managing system as claimed in claim 4, wherein said management control section further includes a response message producing section, upon recognition of a processing task the processing of which is interrupted because of waiting for information from the network element, for forcedly finishing said processing task and receives information from said network element instead of said processing task to produce a message to be transmitted to said manager means on the basis of that information.

7. A network element managing system as claimed in claim 1, wherein said communication control section includes an object managing table for registering a resource identifier every object identifier; and wherein said communication control section executes, upon reception of a processing request relating to the communication process from said manager means, a step of extracting the object identifier of a resource to be processed from said processing request; a step of retrieving said object managing table on the basis of said object identifier to read the resource identifier of said resource; a step of converting said processing request into a command form which can be processed by said network element on said resource identifier; a step of allowing said network element to execute the processing request converted; and a step of transmitting the execution result of said processing request to said manager means.

8. A network element managing system as claimed in claim 7, wherein said communication control section executes a step of requesting said management control section to update the object data storing section on the basis of the execution result of said network element; and a step of updating said object managing table.

9. A network element managing system as claimed in claim 7, wherein said object managing table includes a precedence degree table for storing the precedence degree which determines the execution order of the processing request with respect to the respective objects, and wherein said communication control section includes a processing content analyzing section, upon receiving a processing request relating to communication from said manager means, detects an object identifier to be processed from the processing request to retrieve said precedence degree table on the basis of the object identifier to judge the precedence degree of said processing request; a processing task producing section for producing the processing task which executes said processing request; and a processing task scheduling section for starting said processing task on the basis of the precedence degree which is judged by said processing content analyzing section.

10. A network element managing system as claimed in claim 9, wherein said processing task scheduling section, when restarting the processing of the processing task which has been interrupted, sets the execution order of said processing task to be higher than that other processing tasks.

11. A network element managing system as claimed in claim 9, wherein said communication control section further includes a response message producing section, upon recognition of a processing task the processing of which is interrupted because of waiting for information from the network element, for forcedly finishing said processing task and receives information from said network element instead of said processing task to produce a message to be transmitted to said manager means on the basis of that information.

12. A network element managing system as claimed in claim 1, wherein said scheduling section monitors the processing state of said communication control section and the processing state of said management control section, if the load of said management control section becomes larger than the load of said communication control section, an execution time higher in a precedence order than the processing request relating to the communication processing is assigned to the processing request relating to maintenance/management.

13. A network element managing system, comprising the steps of:

upon receiving a renewal request of an object managing table from a manager means, discriminating data to be updated to discriminate whether the data is in an access prohibition state, or not;

if said data is in an accessible state, then prohibiting access to said data from the interior of the communication control section and access to said data from the exterior of the communication control section;

transmitting the processing request to a network element to receive a reply therefrom if necessary;

updating said data on the basis of said renewal request;

releasing the prohibition of access to said access from the interior of the communication control section;

notifying said manager means of the completion of said data renewal;

transferring said data renewal request to a management control section; and upon receiving the completion of execution of the renewal request from said management control section, releasing the prohibition of access to said data from the exterior of said communication control section.

14. A network element managing system as claimed in claim 13, wherein said management control section executes, upon receiving said renewal request from said communication control section, a step of prohibiting access to said data to be updated which has been stored in said object data storing section;

a step of updating said data on the basis of said renewal request;

a step of releasing the prohibition of access to said data; and a step of notifying said communication control section of the completion of execution of said renewal request.

15. A network element managing system, wherein a management control section executes the steps of:

upon receiving a renewal request of a object data storing section from a manager means, discriminating data to be updated and discriminating whether said data has been also stored in the object managing table of a communication control section, or not;

if said data has been stored in said object managing table, requesting said communication control section to prohibit access to said data;

upon receiving a notice of execution of prohibiting access to said data from said communication control section, converting said data in said object data storing section into an access prohibition state;

issuing a processing request to said network element and receiving a reply to said processing request, if necessary;

notifying said communication control section of said renewal request;

upon receiving a notice of the renewal completion from said communication control section, updating said data which has been stored in said object data storing section;

changing said data in said object data storing section from an access prohibition state into an accessible state; and notifying said manager means of said renewal completion.

16. A network element managing system as claimed in claim 15, wherein said communication control section executes the steps of:

discriminating data to be access-prohibited and discriminating whether said data is in an access prohibition state, or not;

if said data is in an accessible state, prohibiting access to said data from the interior of the communication control section and from the exterior of the communication control section, and notifying said management control section of the execution of prohibiting access;

upon receiving a renewal request of said data from said management control section, updating said data on the basis of that renewal request; releasing the prohibition of access to said data from the interior of the communication control section;

notifying said management control section of the renewal completion of said data;

upon receiving a notice of the renewal completion of said data from said management control section, releasing the prohibition of access to said data from the exterior of the communication control section; and if said data is in the access prohibition state, notifying said management control section of an error of execution of the access prohibition.

* * * * *